(12) United States Patent
Akanuma et al.

(10) Patent No.: US 8,174,750 B2
(45) Date of Patent: May 8, 2012

(54) OPTICAL DEFLECTOR, OPTICAL SCANNER, IMAGE FORMING APPARATUS, AND IMAGE PROJECTOR

(75) Inventors: Goichi Akanuma, Yokohama (JP);
Tomofumi Kitazawa, Kawasaki (JP);
Fumiko Sakoh, Yokohama (JP);
Mitsumi Fujii, Sendai (JP)

(73) Assignee: Ricoh Company, Limited, Tokyo (JP)

( * ) Notice: Subject to any disclaimer, the term of this patent is extended or adjusted under 35 U.S.C. 154(b) by 57 days.

(21) Appl. No.: 12/795,077

(22) Filed: Jun. 7, 2010

(65) Prior Publication Data

US 2010/0309536 A1    Dec. 9, 2010

(30) Foreign Application Priority Data

Jun. 9, 2009 (JP) ................................. 2009-137817
Apr. 26, 2010 (JP) ................................. 2010-100659

(51) Int. Cl.
*G02B 26/08* (2006.01)
(52) U.S. Cl. ................................................... 359/224.1
(58) Field of Classification Search ............. 359/200.8, 359/212.1–214.1, 223.1–226.1
See application file for complete search history.

(56) References Cited

U.S. PATENT DOCUMENTS

2007/0146858 A1 * 6/2007 Matsuda ................. 359/224
2010/0195180 A1   8/2010 Akanuma et al.

FOREIGN PATENT DOCUMENTS

JP  3129219  11/2000
JP  3246106  11/2001

* cited by examiner

*Primary Examiner* — Euncha Cherry
(74) *Attorney, Agent, or Firm* — Oblon, Spivak, McClelland, Maier & Neustadt, L.L.P.

(57) ABSTRACT

An optical deflector, including a fixed base; a mirror having a light reflection surface; a pair of elastic support members oscillatably supporting the mirror; and a pair of drive beams formed of a beam-shaped member on which a piezoelectric is fixed, wherein the elastic support members and the drive beams in longitudinal directions are almost orthogonally located and connected with each other, other ends of the drive beams are fixed on the fixed base, the mirror and the pair of elastic support members are cantilevered by the pair of drive beams relative to the fixed base, and bending oscillation of the drive beams causes torsional deformation of the elastic members to rotationally oscillate the mirror.

14 Claims, 18 Drawing Sheets

MODE 1

MODE 2

MODE 1

MODE 2

MODE 1

MODE 2

OPTICAL DEFLECTOR, OPTICAL SCANNER, IMAGE FORMING APPARATUS, AND IMAGE PROJECTOR

BACKGROUND OF THE INVENTION

1. Field of the Invention

The present invention relates to an optical deflector deflecting and scanning light beams such as laser beams, and more particularly to an optical deflector using piezoelectric force. Further, the present invention relates to an optical scanner using the optical deflector, an image forming apparatus using the optical scanner as an optical writing unit, and an image projector using the optical deflector as a scanning unit.

2. Discussion of the Background

Optical deflectors deflecting and scanning light beams such as laser beams are widely used in image forming apparatuses such as copiers, image projectors, laser beam printers, and barcode scanners. As such optical deflectors, optical deflectors using an electrostatic force, an electromagnetic force, and a piezoelectric force are conventionally known.

The optical deflectors using an electrostatic force include those with an electrode having the shape of a parallel plate and with a pectinate electrode. The optical deflector with a pectinate electrode can generate a comparatively large drive force owing to recent improvement in fine processing technology. However, the optical deflector with a pectinate electrode cannot obtain a sufficient deflection angle of a light beam and has to make up for that with a large drive voltage. However, the parts needed for such an electric source become large to enlarge the drive voltage, resulting in growth in size of the deflector and an increase in cost.

As for the optical deflector using an electromagnetic force, the magnetic force of a permanent magnet or a current of the coil needs increasing, resulting in growth in size of the deflector and an increase in electric power consumption. A deflector using a magnetostrictive film is available to downsize the deflector, but has poor magnetic properties. When current flows through the coil, extra heat is generated, resulting in an increase in electric power consumption as well.

Meanwhile, although the deflector using a piezoelectric force needs a comparatively large drive voltage, it can generate a large force with a small amount of electric power. Thus, when the piezoelectric material is laminated to a beam-shaped elastic member to have a unimorph structure or a bimorph structure, a slight distortion in an inner surface direction due to the piezoelectric force is changed to a warpage to obtain a large deformation. However, the conventional optical deflectors using a piezoelectric force still have various problems.

Japanese Patent No. 3129219 discloses an optical deflector oscillating a whole oscillatably supported frame with a bulk piezoelectric element to rotationally oscillate a micro mirror. However, the bulk piezoelectric element applies an oscillation having a small amplitude and is difficult to make compact, resulting in an increase in cost.

Japanese Patent No. 3246106 discloses an optical deflector in which each end of a pair of piezoelectric bimorphs is fixed on a substrate in the shape of a cantilever beam, free ends thereof are connected with each other with a connection member, and a mirror is located on a torsional deformation member extended from the center of the connection member parallel to the piezoelectric bimorph. Having a torsional deformation member with a free end, the optical deflector can deform in a bending direction as well as a torsional deformation direction, and the mirror is rotatable in a biaxial direction. However, since the torsional deformation member is parallel to the piezoelectric bimorph, a moment generated by bending of the bimorphs is not fully used. As for movement in a bending direction perpendicular to the torsion, since the piezoelectric bimorph exhibits such a small deformation amount that it is difficult to deform in a bending direction when a frequency is increased to increase rigidity of the torsional member, it is difficult to obtain a large amplitude in the movement in a bending direction.

Japanese published unexamined patent application no. 2008-083603 discloses an optical deflector in which a pair of elastic support members connected with both sides of a mirror, oscillatably supporting the mirror, are supported by a pair of drive beams (cantilevers) formed of beam-shaped elastic members laminated with a piezoelectric material at a right angle to an axis of the elastic support members, and the pair of drive beams are driven in reverse phase to rotationally oscillate the mirror. However, since the mirror and the mirror support members are supported by the pair of drive beams, the mirror has a limited rotational amplitude. In addition, four drive beams are needed for rotational amplitude in one direction, resulting in difficulty in downsizing and an increase in cost.

Japanese published unexamined application no. 2004-252337 discloses an optical scanner in which each end of a pair of plate-shaped deformation members circularly curved is fixed on a fixed part, a mirror is supported by another end through a support member, and the pair of formation members are elastically deformed to deflect the mirror. When the structural body is formed of a soft material such as polyimide, a comparatively large amplitude angle can be obtained. However, a material such as silicon can obtain only a slight amplitude angle because a piezoelectric unimorph structure exhibits only a very small deformation amount upon voltage application to the piezoelectric material. The structures of FIGS. 17 and 18 therein accumulate deformation to obtain a large amplitude, but are too large to move quickly.

For these reasons, a need exists for a compact optical deflector having good drive efficiency and a large rotational amplitude.

SUMMARY OF THE INVENTION

Accordingly, an object of the present invention is to provide a compact optical deflector having good drive efficiency and a large rotational amplitude.

Another object of the present invention is to provide an optical scanner using the optical deflector.

A further object of the present invention is to provide an image forming apparatus using the optical scanner as an optical writing unit.

Another object of the present invention is to provide a low-electric-consumption and wide-field-angle image projector using the optical deflector.

These and other objects of the present invention, either individually or collectively, have been satisfied by the discovery of an optical deflector, comprising:

a fixed base;

a mirror having a light reflection surface;

a pair of elastic support members configured to oscillatably support the mirror; and a pair of drive beams formed of a beam-shaped member on which a piezoelectric is fixed, wherein the elastic support members and the drive beams in longitudinal directions are almost orthogonally located and connected with each other, other ends of the drive beams are fixed on the fixed base, the mirror and the pair of elastic support members are cantilevered by the pair of drive beams relative to the fixed base, and bending oscillation of the drive beams causes torsional deformation of the elastic members to rotationally oscillate the mirror.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

Figure 1:
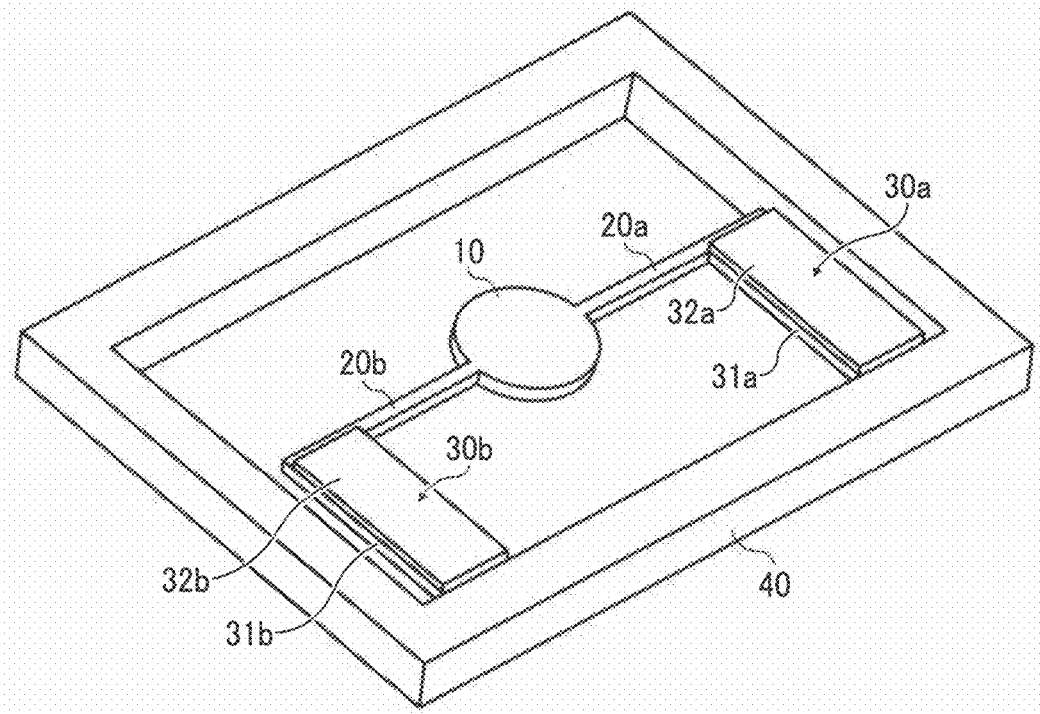
FIG. 1 is a perspective view illustrating an embodiment of the optical deflector of the present invention in Example 1.

The present invention provides a compact optical deflector having good drive efficiency and a large rotational amplitude.

More particularly, the present invention relates to an optical deflector, comprising:

a fixed base;

a mirror having a light reflection surface;

a pair of elastic support members configured to oscillatably support the mirror; and a pair of drive beams formed of a beam-shaped member on which a piezoelectric is fixed, wherein the elastic support members and the drive beams in longitudinal directions are almost orthogonally located and connected with each other, other ends of the drive beams are fixed on the fixed base, the mirror and the pair of elastic support members are cantilevered by the pair of drive beams relative to the fixed base, and bending oscillation of the drive beams causes torsional deformation of the elastic members to rotationally oscillate the mirror.

Hereinafter, embodiments of the present invention will be explained, referring to the drawings.

Example 1

Figure 2:
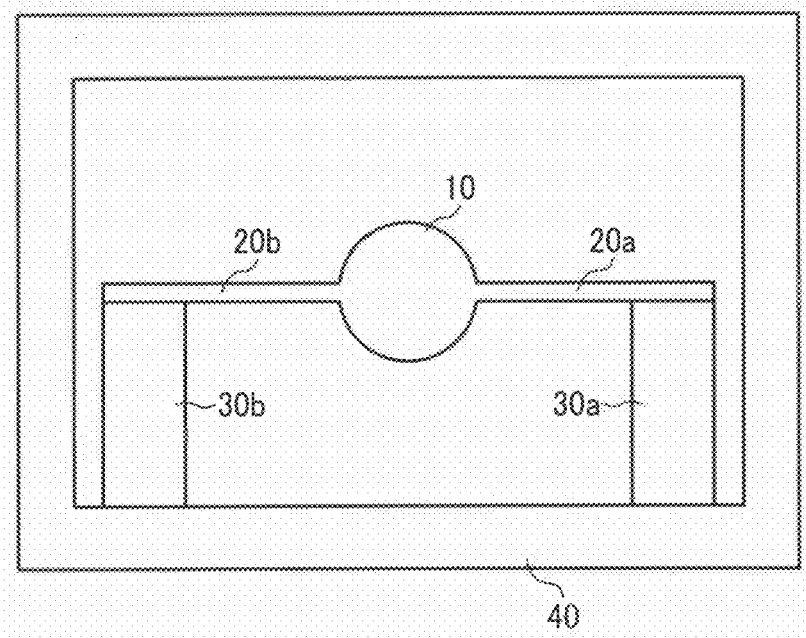
FIG. 2 is a plain view illustrating the optical deflector in FIG. 1.

FIG. 1 is an overall perspective view of the optical deflector in Example 1 of the present invention, and FIG. 2 is a plain view thereof. In FIGS. 1 and 2, numeral 10 is a mirror having a reflection surface reflecting light, and torsion bar springs 20a and 20b as a pair of elastic support members oscillatably supporting the mirror 10 are connected with both ends of thereof. In Example 1, the (gravity) center of the mirror 10 conforms to the central axes of the torsion bar springs 20a and 20b. The other ends of the torsion bar springs 20a and 20b, which are opposite to the mirror, are connected with ends of a pair of beam-shaped members 31a and 31b in a direction almost orthogonal to a longitudinal direction of the torsion bar springs 20a and 20b as a longitudinal direction. The other ends of the beam-shaped members 31a and 31b are connected with a fixed base 40.

The beam-shaped members 31a and 31b are located only one side of the torsion bar springs 20a and 20b, respectively. The beam-shaped members 31a and 31b cantilever the mirror 10 and the torsion bar springs 20a and 20b relative to the fixed base 40. Piezoelectric members 32a and 32b are laminated on each one side of the beam-shaped members 31a and 31b, respectively. The beam-shaped members and piezoelectric members form unimorph-structured drive beams 30a and 30b having the shape of a plate strip-of-paper.

For example, MEME (micro electro mechanical systems) process forms the mirror 10, the torsion bar springs 20a and 20b and the drive beams 30a and 30b in a body. A reflection surface formed of a silicon substrate and a metallic thin film formed thereon is formed on the mirror 10.

Detailed structure of the drive beam will be explained, referring to FIGS. 3A, 3B and 3C.

Figure 3A:
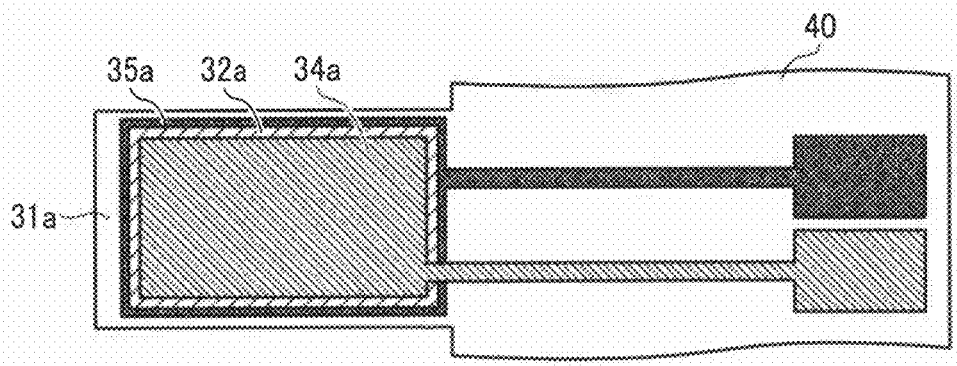
FIGS. 3A, 3B and 3C are schematic views for explaining the configuration of a drive beam of the optical deflector in FIG. 1.
Figure 3B:
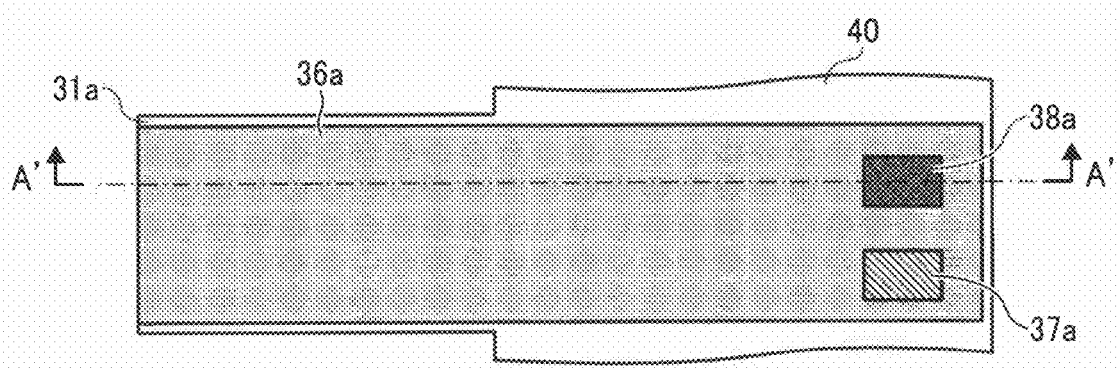
Figure 3C:
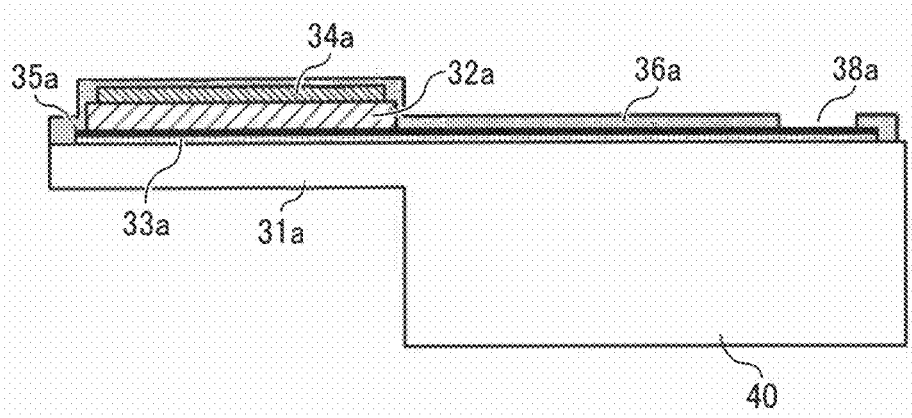

FIGS. 3A, 3B and 3C are schematic views amplifying the drive beam 30a and the fixed base 40. FIG. 3A is a plain view before covered by an insulative layer, FIG. 3B is a plain view after covered by an insulative layer and FIG. 3C is a cross-sectional view of A-A' in FIG. 3B. Having the same structure, the drive beam 30b is not illustrated.

As shown in FIGS. 3A to 3C, the drive beam 30a includes an adhesive layer 33a, a lower electrode 35a, a piezoelectric material (piezoelectric member) 32a, an upper electrode 34a and an insulative layer 36a laminated by sputtering in this order on the beam-shaped 31a projected from the fixed base 40. The drive beam 30a is subjected to etching process so that necessary parts such as lands 37a and 38a are left. The adhesive layer 33a is made of titanium (Ti), the upper electrode 34a and the lower electrode 35a are made of platinum (Pt) and the piezoelectric material 32a is made of lead zirconate titanate (PZT), etc.

When the lands 37a and 38a are wired and a voltage is applied between the upper electrode 34a and the lower electrode 35a, the piezoelectric material 32a elongates and contracts in an in-plane direction of the surface of the beam-shaped member 31a because of its electrostrictivity to warp the whole drive beam 30a to have bending deformation. A voltage having the same in-phase voltage as that for the piezoelectric material 32a is applied to the drive beam 30b to warp the whole drive beam 30b to have bending deformation in the same direction of the drive beam 30a. The voltage applied to the piezoelectric materials 32a and 32b of the drive beams 30a and 30b may have a waveform of pulse wave or sine wave.

As shown in FIGS. 1 and 2, when the torsion bar springs 20a and 20b and the drive beams 30a and 30b in longitudinal directions are almost orthogonally located and connected with each other, bending oscillations of the drive beams 30a and 30b make the tops thereof have up-and-down oscillations, which are perpendicular to the torsion central axes of the torsion bar springs 20a and 20b. The bending oscillations of the drive beams 30a and 30b are efficiently converted to rotational (torsion) oscillations of the torsion bar springs 20a and 20b to rotationally oscillate the mirror 10 largely. The drive beams 30a and 30b cantilever the torsion bar springs 20a and 20b and the mirror 10, and the tops of the drive beams 30a and 30b can freely oscillate and the mirror 10 can obtain a larger angle amplitude. Further, the beam-shaped members 31a and 31b are located only one side of the torsion bar springs 20a and 20b, respectively, and can be downsized. These operations and effects are basically the same as well in the following Examples.

Figure 4:
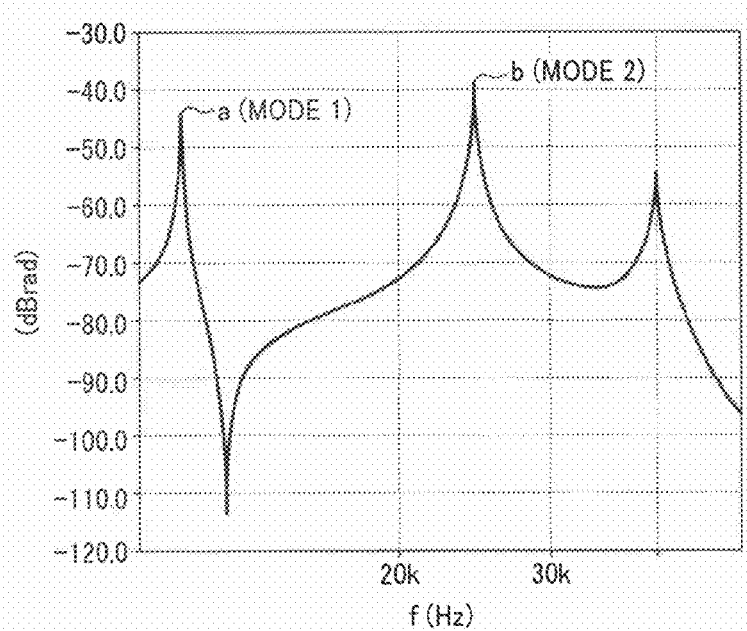
FIG. 4 is a diagram showing a frequency response characteristic of a rotational amplitude of a mirror of the optical deflector in FIG. 1.

FIG. 4 shows a frequency response characteristic of an amplitude of a rotational angle of the mirror 10 in the optical deflector of the present invention, relative to a voltage applied to the piezoelectric materials 32a and 32b of the drive beams 30a and 30b. In FIG. 4, a and b are resonance points, respectively. The mirror 10 shows different characteristic oscillation mode forms for a and b, respectively. The characteristic oscillation mode form at the resonance point a is mode 1 and that at b is mode 2.

Figure 5A:
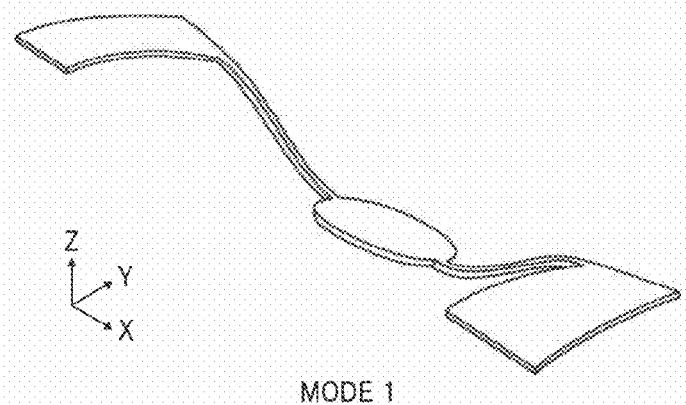
FIGS. 5A and 5B are schematic views illustrating two characteristic oscillation mode forms of the mirror of the optical deflector in FIG. 1.
Figure 5B:
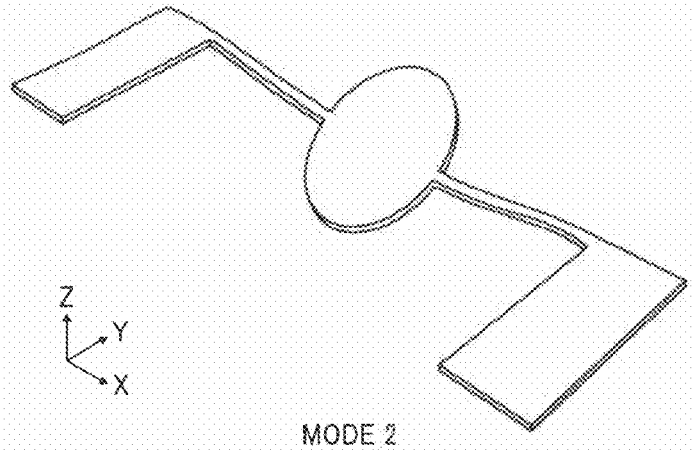

FIGS. 5A and 5B are characteristic oscillation mode forms (modes 1 and 2) of the mirror 10 at the resonance points a and b in the frequency response characteristic in FIG. 4. As FIG. 5A shows, in mode 1, the bending deformation of the torsion bar springs 20a and 20b varies the whole mirror 10 in Z direction. In mode 2, as FIG. 5B shows, the torsion bar springs 20a and 20b have almost no bending deformation and largely twist, and the mirror 10 largely rotates around the center of the mirror. The optical deflector uses the frequency of the mode 2 because of needing to inhibit the whole mirror from varying in Z direction and rotate the mirror 10 around the center thereof. A voltage is applied to the piezoelectric materials 32a and 32b of the drive beams 30a and 30b with a characteristic frequency of the mode 2 so that the mirror 10 can obtain a large angle amplitude and variation of the whole mirror 10 in Z direction can be inhibited.

Specifically, the shape of the mirror (weight) and the resonant frequency determine the shapes of the torsion bar springs 20a and 20b. The characteristic frequency of the first bending deformation mode of the drive beams 30a and 30b is set close to the characteristic frequency of the first torsion deformation of the torsion bar springs 20a and 20b. Thus, the mirror 10 oscillates at a large angle amplitude.

As mentioned above, the voltage applied to the piezoelectric materials 32a and 32b of the drive beams 30a and 30b may have a waveform of pulse wave or sine wave, and the frequency has only to be close to the characteristic frequency of the mode 1.

In this Example, piezoelectric materials are laminated by sputtering on both of the lower and upper electrodes (FIG. 3). Bulk piezoelectric materials cut in predetermined sizes may be pasted with an adhesive or formed by aerosol deposition (AD) methods. The drive beam has a unimorph structure in which a piezoelectric material is located on one side of the beam-shaped member, and may have a bimorph structure in which a piezoelectric material is located on both sides of the beam-shaped member. This is the same for the following Examples.

Example 2

Figure 6:
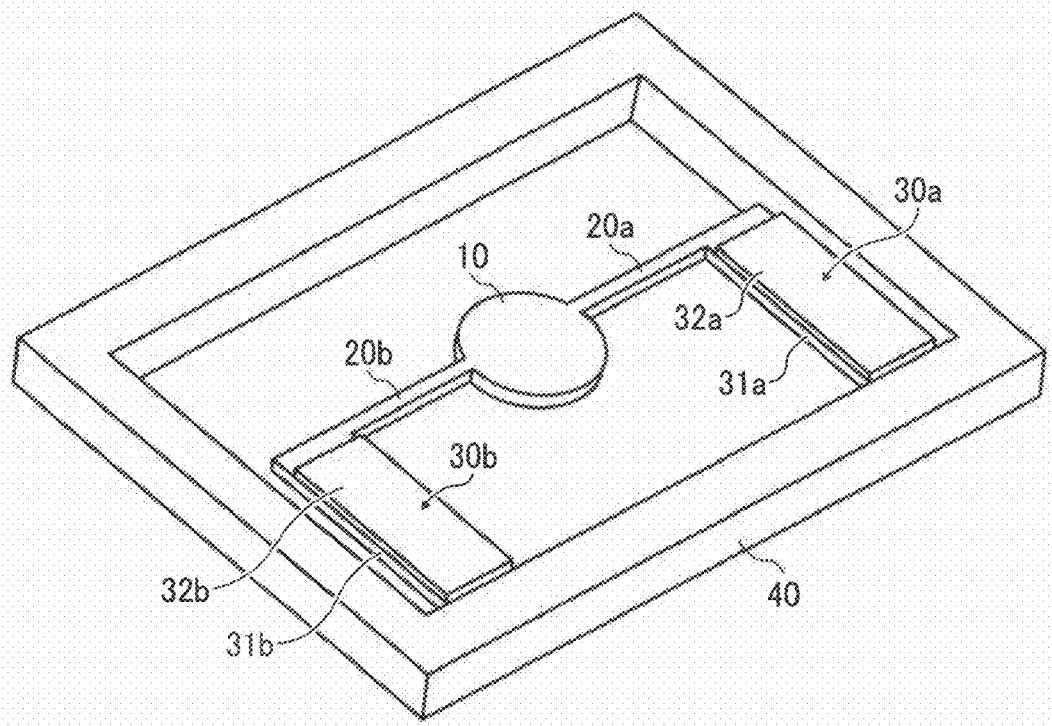
FIG. 6 is a perspective view illustrating another embodiment of the optical deflector of the present invention in Example 2.
Figure 7:
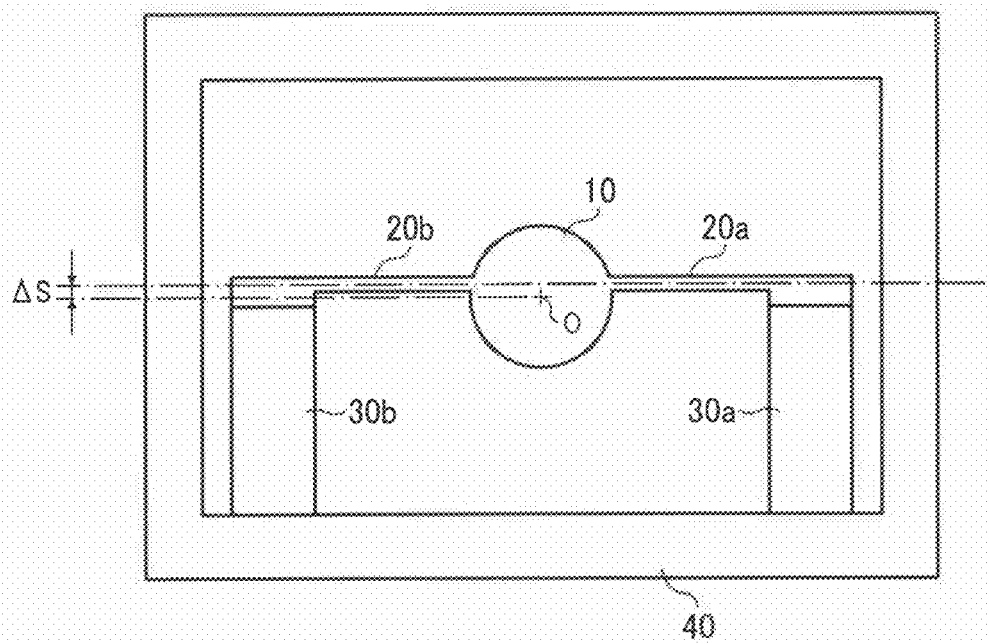
FIG. 7 is a plain view illustrating the optical deflector in FIG. 6.

FIG. 6 is a perspective view illustrating another embodiment of the optical deflector of the present invention in Example 2, and FIG. 7 is a plain view thereof. Parts in FIGS. 6 and 7 which are the same as those in FIGS. 1 and 2 have the same numbers therein.

As shown in FIG. 7, the (gravity) center O of the mirror 10 is offset for a distance ΔS in a direction close to connection points between each of the torsion bar springs 20a and 20b and the fixed base 40. Thus, flexural deformations of the drive beams 30a and 30b can rotationally oscillate the mirror 10 more largely than Example 1. The driving method is the same as that of Example 1.

Figure 8:
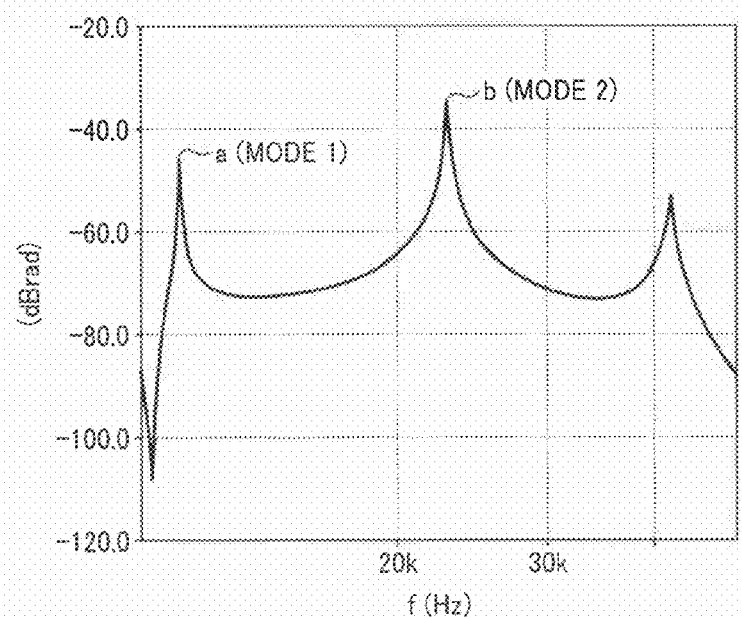
FIG. 8 is a diagram showing a frequency response characteristic of a rotational amplitude of a mirror of the optical deflector in FIG. 6.
Figure 9A:
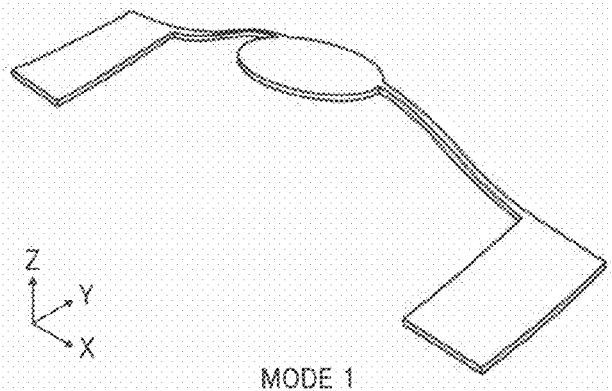
FIGS. 9A and 9B are schematic views illustrating two characteristic oscillation mode forms of the mirror of the optical deflector in FIG. 6.
Figure 9B:
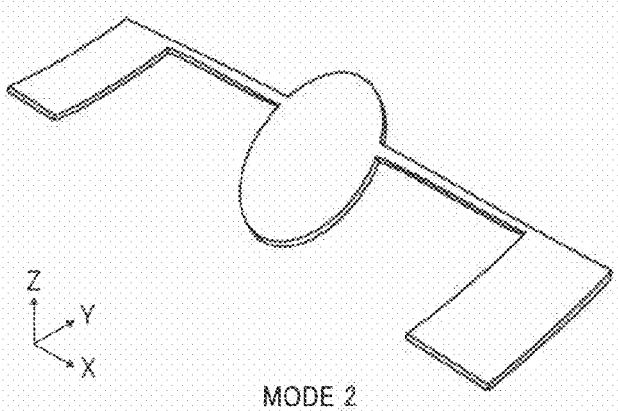

FIG. 8 is a diagram showing a frequency response characteristic of an amplitude of a rotational angle of the mirror 10 to a voltage applied to the piezoelectric materials 32a and 32b of the drive beams 30a and 30b when the center of gravity of the mirror 10 is offset. FIGS. 9A and 9B are schematic views illustrating characteristic oscillation mode forms of the mirror 10 at resonance points a and b (mode 1 and mode 2) in the frequency response characteristic in FIG. 8. A voltage is applied to the piezoelectric materials 32a and 32b of the drive beams 30a and 30b with a characteristic frequency of the mode 2 so that the mirror 10 can obtain a large angle amplitude and variation of the whole mirror 10 in Z direction can be inhibited. Further, the mirror 10 can obtain a larger angle amplitude than that in Example 1.

Figure 10:
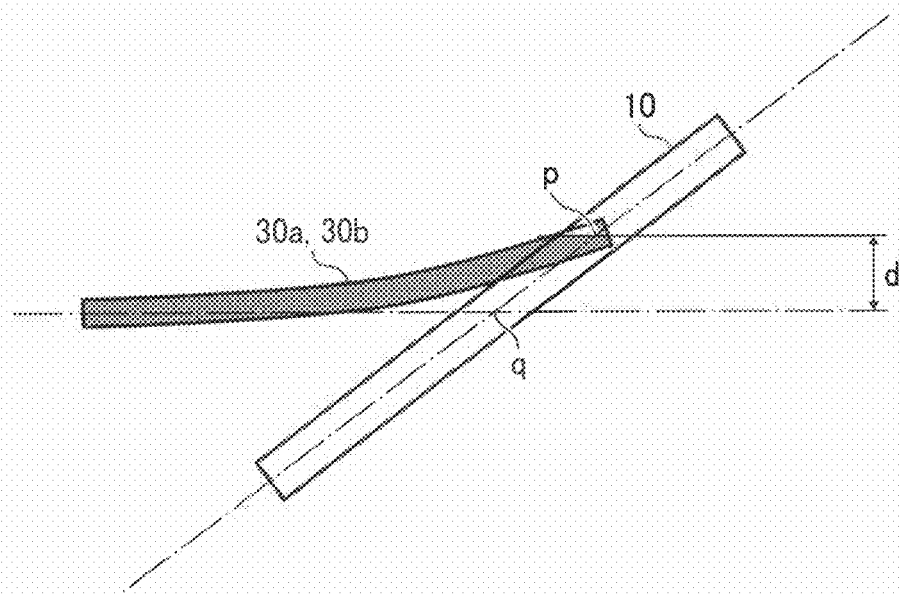
FIG. 10 is a schematic view for explaining a relation between a bending deformation of a drive beam of the optical deflector in FIG. 6 and a rotation of a mirror thereof.

FIG. 10 is a schematic view for explaining a relation between a bending deformation of the drive beam in the mode 2 and a rotation of the mirror. In the mode 2 where the torsion bar springs 20a and 20b twist, when a flexural deformation d in a direction (Z direction) perpendicular to the mirror reflection surface of the drive beams 30a and 30b is ΔS·sin θ, in which ΔS is a distance from a connection point p between the mirror 10 and each of the torsion bar springs 20a and 20b and a rotation center q of the mirror 10 and the mirror 10 has a rotation angle θ, the rotation center q of the mirror 10 does not vary in Z direction when rotating. The rotation center of the mirror 10 is close to the center of gravity O thereof, the inertia moment is small and the characteristic frequency can be increased. Namely, the deflector can be driven at higher speed.

The center of gravity of the mirror 10 is a center of gravity of a whole rotational part supported by the torsion bar springs 20a and 20b, and the center of gravity including a rib structure on the backside of the mirror may be offset. When the mirror wholly has equal weight, the center of the mirror 10 is the center of gravity thereof.

Example 3

Figure 11:
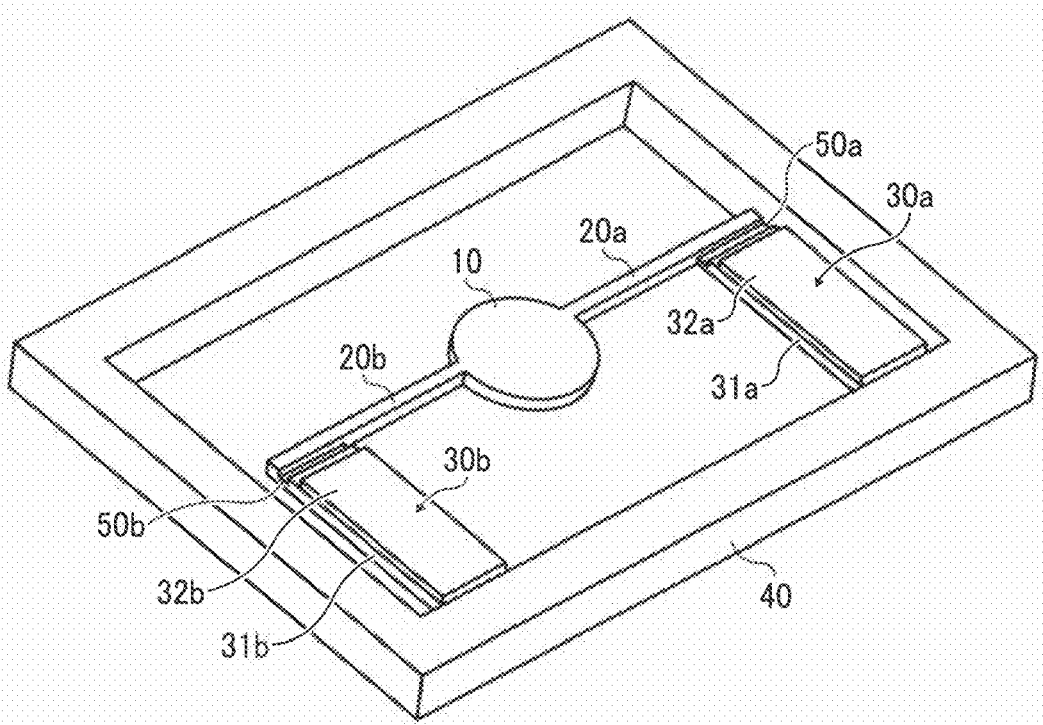
FIG. 11 is a perspective view illustrating a further embodiment of the optical deflector of the present invention in Example 3.

FIG. 11 is a perspective view illustrating a further embodiment of the optical deflector of the present invention in Example 3. Parts in FIG. 11 which are the same as those in FIG. 1 have the same numbers therein. The total configuration is the same as that in Example 1. Dents 50a and 50b are formed on a connection point between each of the drive beams 30a and 30b and the torsion bar springs 20a and 20b so that the thickness in a direction (Z direction) perpendicular to the mirror surface of the mirror 10 may be partially small. Thus, the flexural deformation of the drive beams 30a and 30b basally rotates the torsion bar springs 20a and 20b, and the rotation amplitude of the mirror 10 can further be increased.

Figure 12:
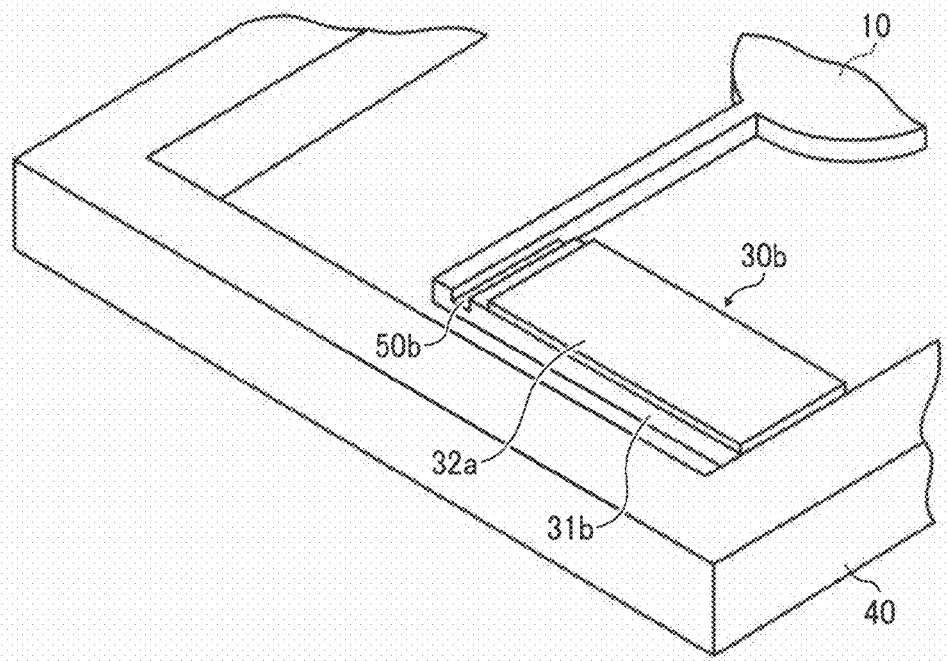
FIG. 12 a partially-amplified perspective view illustrating a detail of a connection between a torsion bar spring of the optical deflector in FIG. 11 and a drive beam thereof.

FIG. 12 a partially-amplified perspective view illustrating a connection between the drive beam 30b and the torsion bar spring 20b. As FIG. 12 shows, a bump on a connection point between the beam-shaped member 31b and the torsion bar spring 20b can easily form the dent 50b. This is the same on a connection point between the beam-shaped member 31a and the torsion bar spring 20a.

The (gravity) center of the mirror 10 may be offset in a direction close to a connection point between each of the drive beams 30a and 30b and the fixed base 40 relative to the center of each of the torsion bar springs 20a and 20b. Thus, the rotation amplitude of the mirror 10 can further be increased.

Example 4

Figure 13:
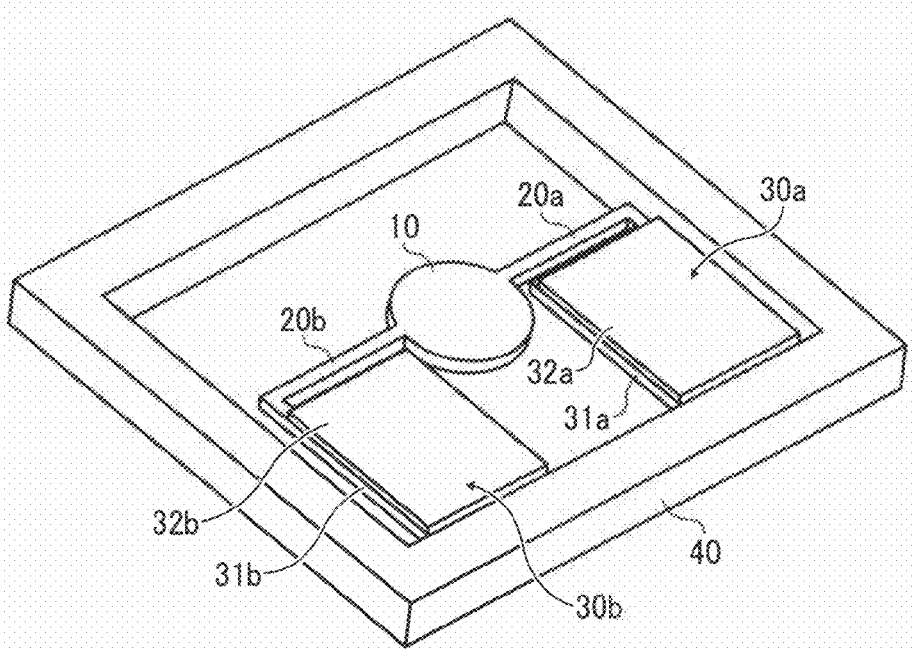
FIG. 13 is a perspective view illustrating another embodiment of the optical deflector of the present invention in Example 4.
Figure 14:
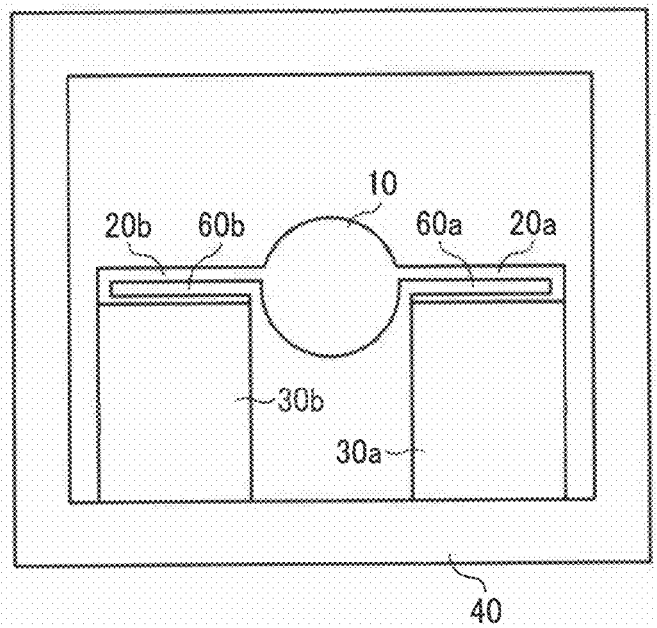
FIG. 14 is a plain view illustrating the optical deflector in FIG. 13.

FIG. 13 is a perspective view illustrating another embodiment of the optical deflector of the present invention in Example 4, and FIG. 14 is a plain view thereof. Parts in FIGS. 13 and 14 which are the same as those in FIGS. 1 and 2 have the same numbers therein. The total configuration is the same as that in Example 1. As FIG. 14 shows, cuts 60a and 60b are formed on a connection point between each of the drive beams 30a and 30b and the torsion bar springs 20a and 20b. Specifically, the cuts 60a and 60b are formed on a connection point between each of the drive beams 30a and 30b and the torsion bar springs 20a and 20b so that ends of the drive beams 30a and 30b toward the mirror 10 are closer thereto than ends of the torsion bar springs 20a and 20b opposite to the mirror 10.

The torsion bar springs 20a and 20b have large nonlinearity as a characteristic of springs. The shorter the length, the larger the nonlinearity, and it is difficult to design the spring. The larger the torsion bar springs 20a and 20b, the larger an allowable displacement angle.

While the lengths of the torsion bar springs 20a and 20b are maintained in a desired range, the drive beams 30a and 30b are located in vacant spaces, namely offset inward to further downsize the optical deflector. When optical deflectors are produced by MEMS process, the number thereof produced from a wafer increases, which reduces cost.

Example 5

Figure 15:
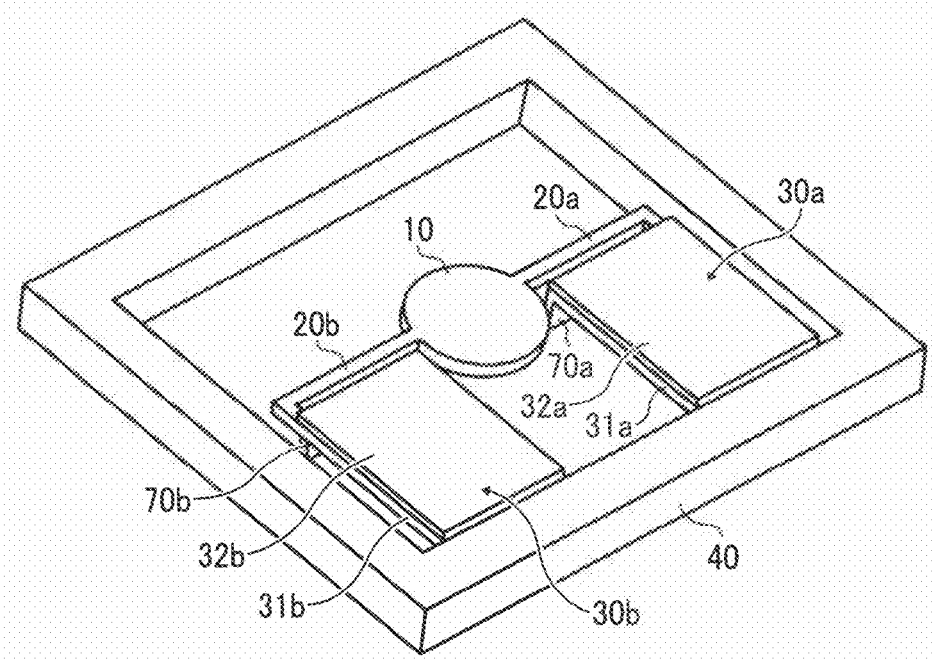
FIG. 15 is a perspective view illustrating a further embodiment of the optical deflector of the present invention in Example 5.
Figure 16:
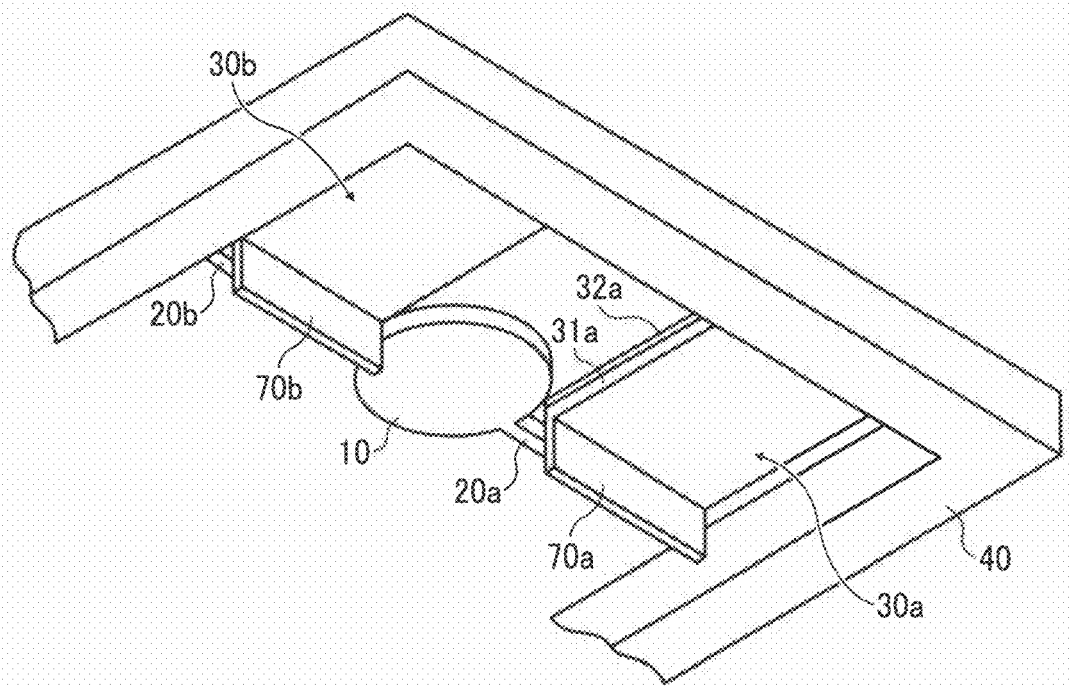
FIG. 16 a partially-amplified perspective view illustrating the backside of the optical deflector in FIG. 15.

FIG. 15 is a perspective view illustrating a further embodiment of the optical deflector of the present invention in Example 5. FIG. 16 a partially-amplified perspective view illustrating the backside of the optical deflector therein. The total configuration is the same as that in Example 4. Tops of the drive beams 30a and 30b (the beam-shaped members 31a and 31b) partially have thick shapes 70a and 70b.

When the widths of the drive beams 30a and 30b are wide in Example 4, the drive beams 30a and 30b twist and a strength of a part apart from a connection point with the torsion bar spring 20b is not transmitted. All strengths can effectively be used when the tops of the drive beams 30a and 30b are partially thick. In FIG. 16, tops of the beam-shaped members 31a and 31b of the drive beams 30a and 30b have the shapes of L, and may have any shapes if the torsion of the drive beams 30a and 30b can be prevented.

In Examples 4 and 5, the (gravity) center of the mirror 10 may be offset in a direction close to a connection point between each of the drive beams 30a and 30b and the fixed base 40 relative to the center of each of the torsion bar springs 20a and 20b. Thus, the rotation amplitude of the mirror 10 can further be increased.

Example 6

Figure 17:
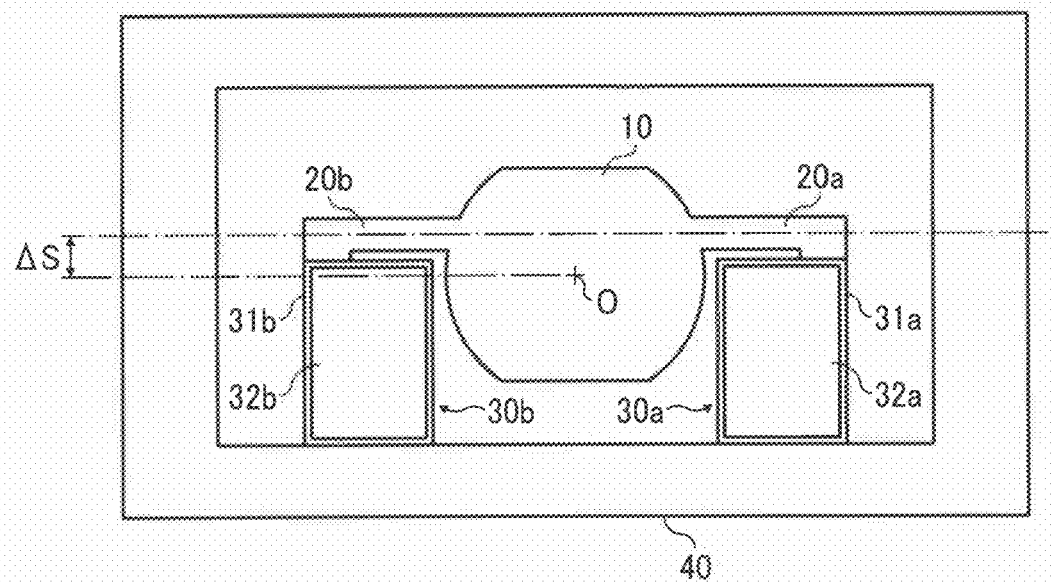
FIG. 17 is a plain view illustrating another embodiment of the optical deflector of the present invention in Example 6.

FIG. 17 is a plain view illustrating another embodiment of the optical deflector of the present invention in Example 6. The total configuration is the same as those in FIGS. 1 and 2. In FIG. 17, numeral 10 is a mirror having a reflection surface reflecting light, and torsion bar springs 20a and 20b as a pair of elastic support members oscillatably supporting the mirror 10 are connected with both ends of thereof. In FIG. 17, the (gravity) center O of the mirror 10 is offset as is in FIG. 7. As shown in FIG. 1, the (gravity) center O of the mirror 10 may conform to the central axes of the torsion bar springs 20a and 20b. The mirror 10 does not need to have a shape in FIG. 17, and may have a circular form.

The other ends of the torsion bar springs 20a and 20b, which are opposite to the mirror, are connected with ends of a pair of beam-shaped members 31a and 31b in a direction almost orthogonal to a longitudinal direction of the torsion bar springs 20a and 20b as a longitudinal direction. The other ends of the beam-shaped members 31a and 31b are connected with a fixed base 40.

The beam-shaped members 31a and 31b are connected with the torsion bar springs 20a and 20b in the same direction from the fixed base 40 projectingly and located only one side of the torsion bar springs 20a and 20b, respectively. The beam-shaped members 31a and 31b cantilever the mirror 10 and the torsion bar springs 20a and 20b relative to the fixed base 40. Piezoelectric members 32a and 32b are laminated on each one side of the beam-shaped members 31a and 31b, respectively. The beam-shaped members and piezoelectric members form unimorph-structured drive beams 30a and 30b having the shape of a plate strip-of-paper. Specific configurations of the drive beams 30a and 30b are the same as those in FIG. 3 and are not illustrated. When a voltage is applied between an upper electrode and a lower electrode formed on the piezoelectric members 32a and 32b, they change in volume because of their electrostrictivities, and elongate and contract in an in-plane direction of the surface of the beam-shaped members 31a and 31b, resulting in bending deformations of the whole drive beams 30a and 30b.

Similarly to FIGS. 1 and 2, when the torsion bar springs 20a and 20b and the drive beams 30a and 30b in longitudinal directions are almost orthogonally located and connected with each other, a torque caused by bending deformations of the drive beams 30a and 30b can efficiently be converted to torsion direction deformation of the torsion bar springs 20a and 20b. The drive beams 30a and 30b cantilever the torsion bar springs 20a and 20b and the mirror 10, and the tops of the drive beams 30a and 30b can freely oscillate and the mirror 10 can obtain a large angle amplitude.

As mentioned later, a difference between Examples 1 and 6 is a relation between characteristic frequencies of a bending mode and a torsion mode.

Figure 18:
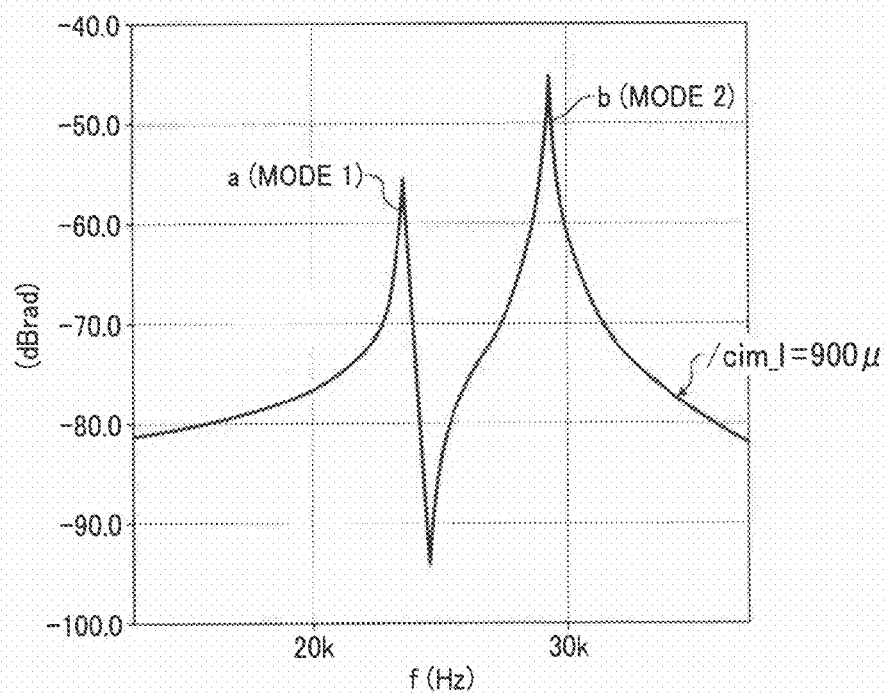
FIG. 18 is a diagram showing a frequency response characteristic of a rotational amplitude of a mirror of the optical deflector in FIG. 17.

FIG. 18 is a frequency response characteristic of an amplitude of an rotational angle of the mirror 10 when a sine wave having the same phase is applied to the piezoelectric members 32a and 32b of the drive beams 30a and 30b and the frequency is changed. In FIG. 18, the mirror 10 has different characteristic oscillation mode forms at a and b, respectively. The characteristic oscillation mode form at the resonance point a is mode 1 and that at the resonance point b is mode 2.

Figure 19A:
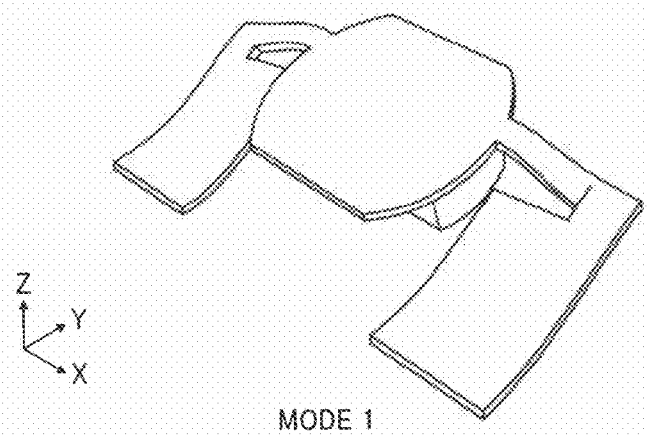
FIGS. 19A and 19B are schematic views illustrating two characteristic oscillation mode forms of the mirror of the optical deflector in FIG. 17.
Figure 19B:
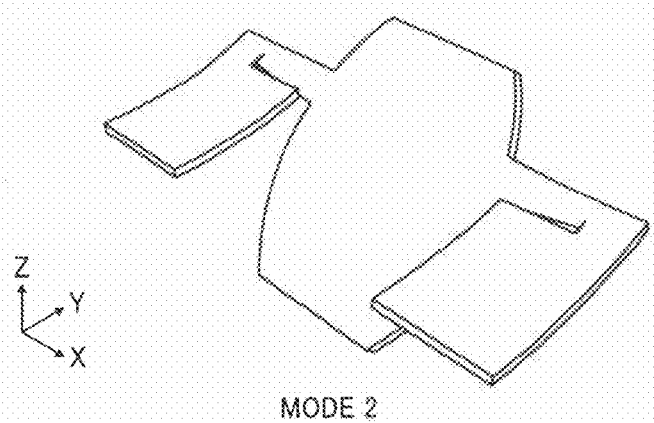

FIGS. 19A and 19B are schematic views illustrating two characteristic oscillation mode forms (mode 1 and mode 2) of the mirror 10 at resonance points a and b in the frequency response characteristic in FIG. 13. As FIG. 19A shows, the mode 1 mainly includes first bending deformations of the drive beams 30a and 30b and first bending deformations of the torsion bar springs 20a and 20b (bending mode), and the whole mirror 10 varies in Z direction. Meanwhile, as FIG. 19B shows, the mode 2 mainly includes first torsion deformations of the torsion bar springs 20a and 20b (torsion mode), and the mirror 10 largely rotates in X direction. Therefore, the mode 2 having a large rotational amplitude of the mirror 10 is actually used as used in Example 1.

The characteristic frequencies of the mode 1 and mode 2 vary according to size of the structure. The larger the amplitude angle of the mirror 10, the better as an optical deflector. The present inventors discovered that the mirror 10 in the mode 2 particularly has a large amplitude angle when the characteristic frequency of the mode 1 is lower than that of the mode 2.

Figure 20:
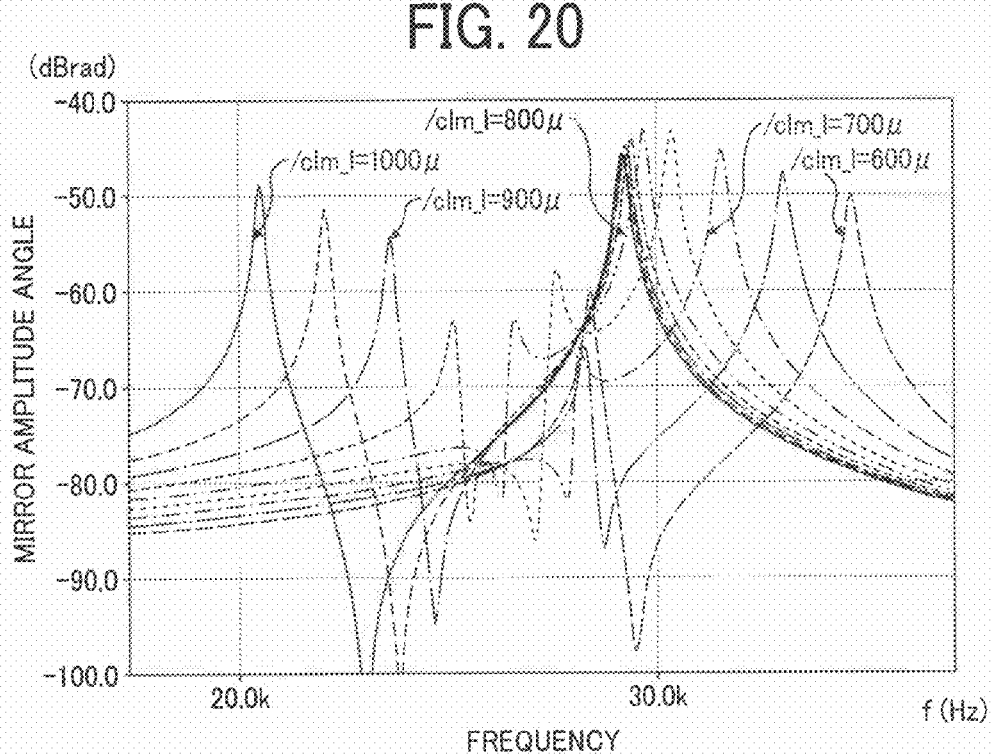
FIG. 20 is a diagram showing a frequency response characteristic of a rotational amplitude of a mirror of the optical deflector in FIG. 17 when a drive frequency is varied with a length of a drive beam as a parameter.
Figure 21:
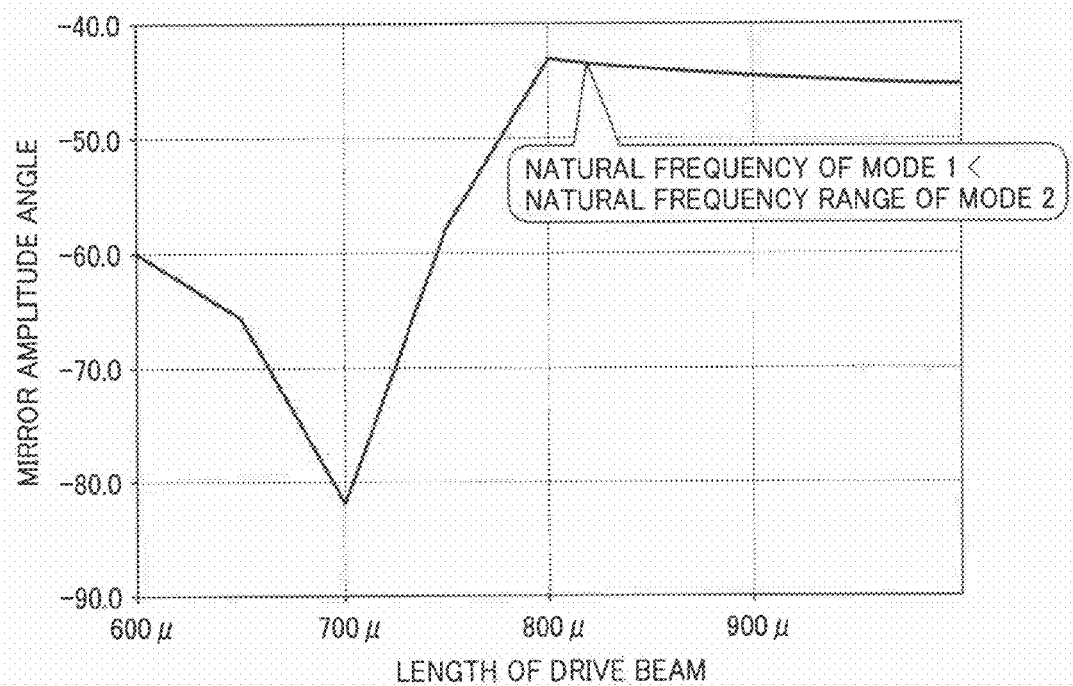
FIG. 21 is a diagram showing a relation between a length of the drive beam and a rotational amplitude of the mirror in mode 2.

A relation between the characteristic frequencies of the mode 1 and mode 2, and the size of the structure will be explained further in detail. Since the mode 1 mainly includes first bending deformations of the drive beams 30a and 30b, only the characteristic frequency of the mode 1 can be varied by changing lengths in longitudinal directions (hereinafter referred to as lengths) of the drive beams 30a and 30b. FIG. 20 is a diagram showing a frequency characteristic of an angle amplitude of the mirror 10 when the drive frequency is changed while lengths of the drive beams 30a and 30b are parameters. FIG. 21 is a diagram showing how an angle amplitude of the mirror 10 in the mode 2 varies relative to the lengths of the drive beams 30a and 30b, based on the frequency response characteristic in FIG. 20.

According to FIG. 21, when the lengths of the drive beams 30a and 30b are not less than predetermined (about 800 μm or more), the angle amplitudes (resonance amplitudes) of the mode 2 are large without exception. This is also when the characteristic frequency of the mode 1 is lower than that of the mode 2. In FIG. 21, an area where the lengths of the drive beams 30a and 30b are not greater than 800 μm is an area where the characteristic frequency of the mode 1 is larger than that of the mode 2, and the mode 2 cannot obtain a large amplitude.

The frequency response characteristic in FIG. 18 is when the lengths of the drive beams 30a and 30b are 900 μm. A natural frequency of the mode 1 is lower than that of the mode 2, and the mirror 10 has a large angle amplitude. The natural frequency of the mode 1 mainly including first bending deformations of the drive beams 30a and 30b and first bending deformations of the torsion bar springs 20a and 20b is lower than that of the mode 2 mainly including first bending deformations of the torsion bar springs 20a and 20b. When a drive signal of the natural frequency of the mode 2 is applied to the drive beams 30a and 30b, the mirror 10 can have a large angle amplitude with a small drive voltage. The oscillation signal may have a pulse waveform or a sine waveform and the frequency may be close to the natural frequency of the mode 2.

In FIG. 17, as shown in FIG. 7, the (gravity) center O of the mirror 10 is offset in a direction close to connection points between each of the drive beams 30a and 30b and the fixed base 40, relative to a central axis of the torsion bar spring 20. The torsion bar springs 20a and 20b have larger torques as they do in Example 2, which can further enlarge a rotational angle of the mirror 10.

The configurations of Examples 3 to 5 can be used even in this Example. Example 4 is used for the configuration of FIG. 17 for convenience.

Example 7

Figure 22A:
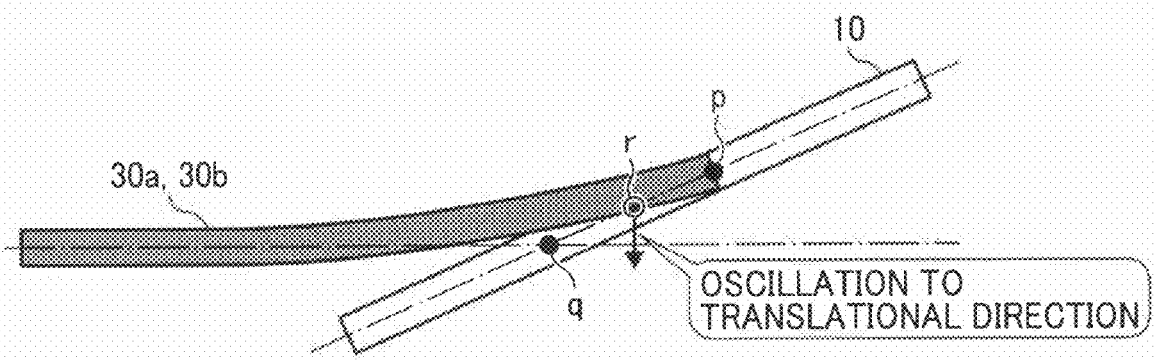
FIGS. 22A and 22B are conceptual views for explaining a further embodiment of the optical deflector of the present invention in Example 7.
Figure 22B:
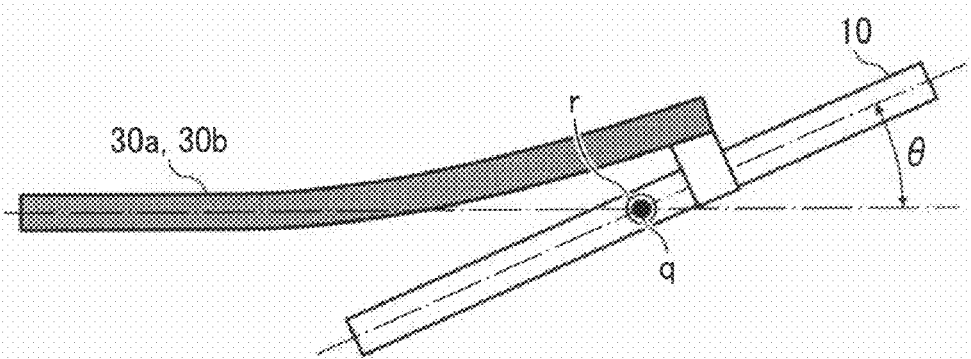

The optical deflector in Example 7 has the same basic configuration as that of Example 6. FIGS. 22A and 22B are conceptual views of Example 7.

FIG. 22A is a view of a deformed shape of the mode 2 in FIG. 17, seen from x-axis direction. When the (gravity) center O of the mirror 10 is offset in a direction close to connection points between each of the drive beams 30a and 30b and the fixed base 40, relative to a central axis of the torsion bar spring 20, an oscillation in a translation direction is added to the mirror 10 in the characteristic oscillation mode form of the mirror 10 of the mode 2 (FIG. 19B) as FIG. 22A shows. In FIG. 22A, p represents a connection point between the mirror 10 and each of the torsion bar springs 20a and 20b, q is the center of a rotational axis of the mirror 10, and r is the center of the mirror 10.

FIG. 22B is a view of a deformed shape of the mode 2 in Example 7, seen from x-axis direction. As shown in FIG. 22B, the mirror 10 in the deformed shape of the mode 2 in Example 7, the mirror 10 rotates around a geometric center thereof (q is conformed to r) so that the mirror 10 may not oscillate in a translation direction. When such an optical deflector is used in an optical scanner mentioned later, positional displacement of an optical scanning beam can be prevented. The mirror 10 has a minimum inertia moment and high-speed movement can be made, and further an amplitude angle θ of the mirror 10 can be increased.

Example 8

Figure 23A:
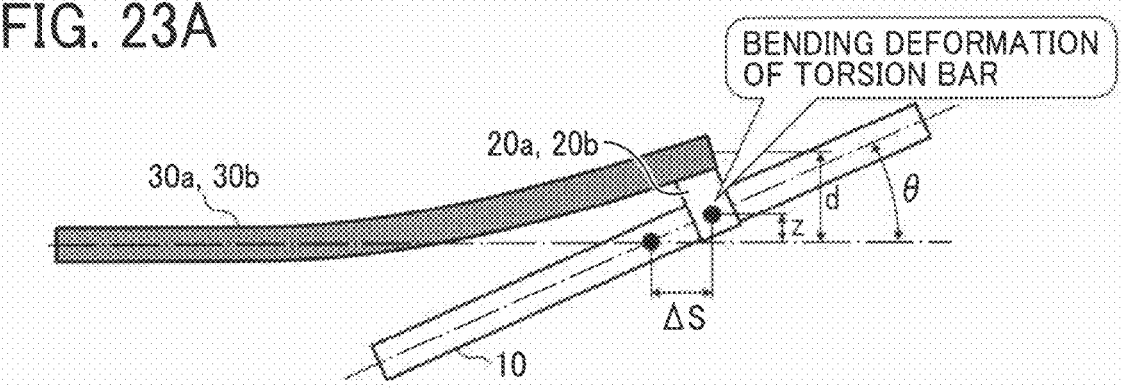
FIGS. 23A and 23B are conceptual views for explaining another embodiment of the optical deflector of the present invention in Example 8.
Figure 23B:
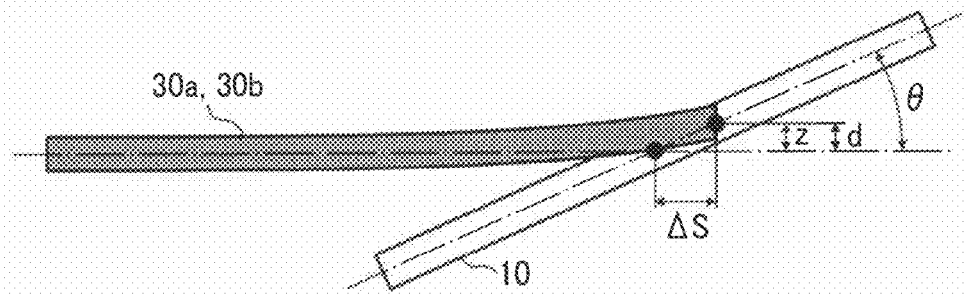

The optical deflector in Example 8 has the same basic configuration as Example 6. Even if Example 7 should be applied thereto, in the characteristic oscillation mode form of the mode 2 (FIG. 19B), the torsion bar springs 20a and 20b have not only torsion deformations but also bending deformations. The torsion bar springs 20a and 20b break due to a stress of the bending deformations when the optical deflector is activated. This Example, in the characteristic oscillation mode form of the mode 2, shows a configuration of the torsion bar springs 20a and 20b without bending deformations. FIGS. 23A and 23B are conceptual views of Example 8.

FIG. 23A is the same as FIG. 22B. In the characteristic oscillation mode form of the mode 2, the drive beams 30a and 30b have large bending deformations, and the torsion bar springs 20a and 20b have not only torsion deformations but also bending deformations. In FIG. 23A, d represents bending deformation (deflection) amounts of the drive beams 30a and 30b, and z represents an amplitude amount of a connection points between the mirror 10 and each of the torsion bar springs 20a and 20b.

FIG. 23B is a deformed shape of the mode 2 in Example 8, seen from x-axis direction. In this Example, in the characteristic oscillation mode form of the mode 2, the bending deformation (deflection) amounts d of the drive beams 30a and 30b is almost equal to the amplitude amount z of a connection points between the mirror 10 and each of the torsion bar springs 20a and 20b. This can inhibit a bending deformation of the torsion bar springs 20a and 20b.

The present inventors discovered that, in Example 6, when the characteristic frequency of the mode 1 mainly including first bending deformations of the drive beams 30a and 30b and of the torsion bar springs 20a and 20b almost conforms to the characteristic frequency of the mode 2 mainly including torsion deformations of the torsion bar springs, the bending deformation amounts of the drive beams 30a and 30b is almost equal to the amplitude amount of a connection points between the mirror 10 and each of the torsion bar springs 20a and 20b (a deformation amount in a perpendicular direction to the mirror reflection surface at the connection point) as FIG. 23B shows.

Figure 24:
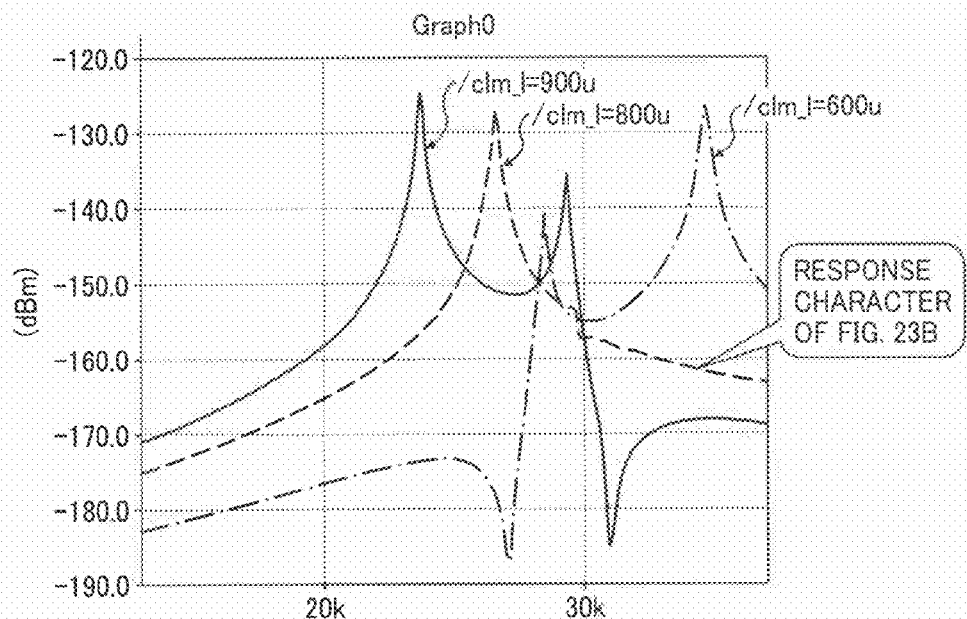
FIG. 24 is a diagram showing a frequency response characteristic of a relative amount of displacement among a torsion bar spring, a mirror connection point and a top of a drive beam when a drive frequency is varied with a length of a drive beam as a parameter.

This will be explained in detail using FIG. 24. Since the mode 1 mainly includes bending deformations of the drive beams 30a and 30b, for example, the lengths of the drive beams 30a and 30b are changed to change only the characteristic frequency of the mode 1. FIG. 24 is a frequency response characteristic of a relative amount of displacement among a torsion bar spring, a mirror connection point and a top of a drive beam when a drive frequency is varied with lengths of the drive beams 30a and 30b as a parameter. For convenience, FIG. 24 shows only when the drive beams 30a and 30b have lengths of 600, 800 and 900 μm. When the drive beams 30a and 30b have a length of 800 μm, the relation in FIG. 23B is observed. FIGS. 20 and 21 show that just when the characteristic frequency of the mode 1 almost conforms to that of the mode 2 just when he drive beams 30a and 30b have a length about 800 μm.

Figure 25A:
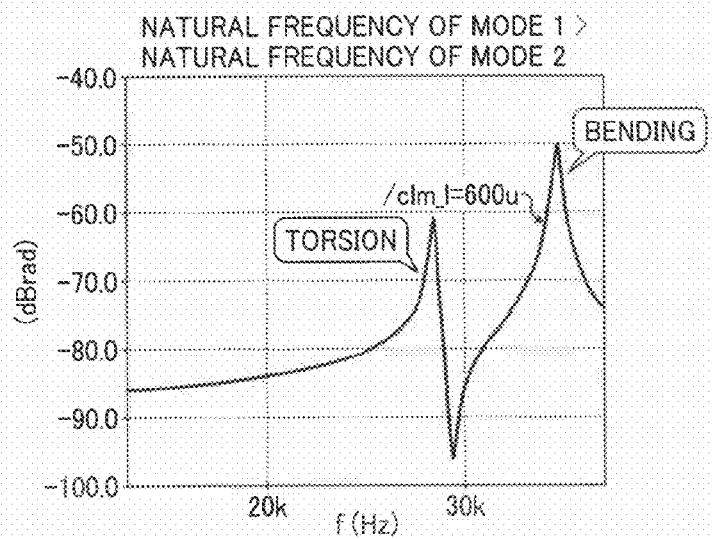
FIGS. 25A, 25B and 25C are diagrams comparing frequency response characteristics of rotational amplitudes of mirrors with a length of a drive beam as a parameter.
Figure 25B:
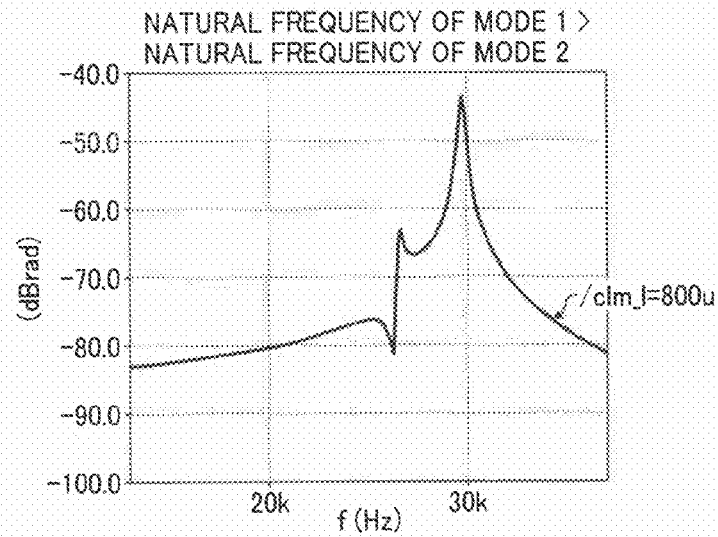
Figure 25C:
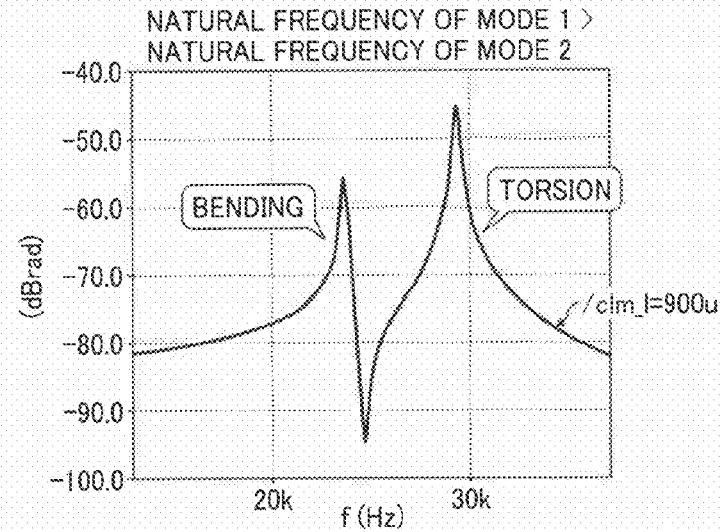

FIGS. 25A, 25B and 25C, corresponding to FIG. 24, are diagrams comparing frequency response characteristics of angle amplitudes of the mirror when the drive beams 30a and 30b have lengths of 600, 800 and 900 μm, extracted from FIG. 20. FIG. 25A is when the drive beams 30a and 30b have a length of 600 μm and the characteristic frequency of the mode 1 is larger than that of the mode 2. FIG. 25B is when the drive beams 30a and 30b have a length of 800 μm and the characteristic frequency of the mode 1 is almost equal to that of the mode 2. Example 8 corresponds to this. FIG. 25C is when the drive beams 30a and 30b have a length of 900 μm and the characteristic frequency of the mode 1 is lower than that of the mode 2. Example 6 corresponds to this.

The lengths of the drive beams 30a and 30b are changed to change the characteristic frequency of the mode 1, and the lengths of the torsion bar springs 20a and 20b may be changed. Further, both of the lengths of the drive beams 30a and 30b, and the torsion bar springs 20a and 20b may be changed. Thus, the characteristic frequency of the mode 1 or mode 2 is changed so that the mode 2 can have the most suitable deformation shape.

Example 9

Figure 26:
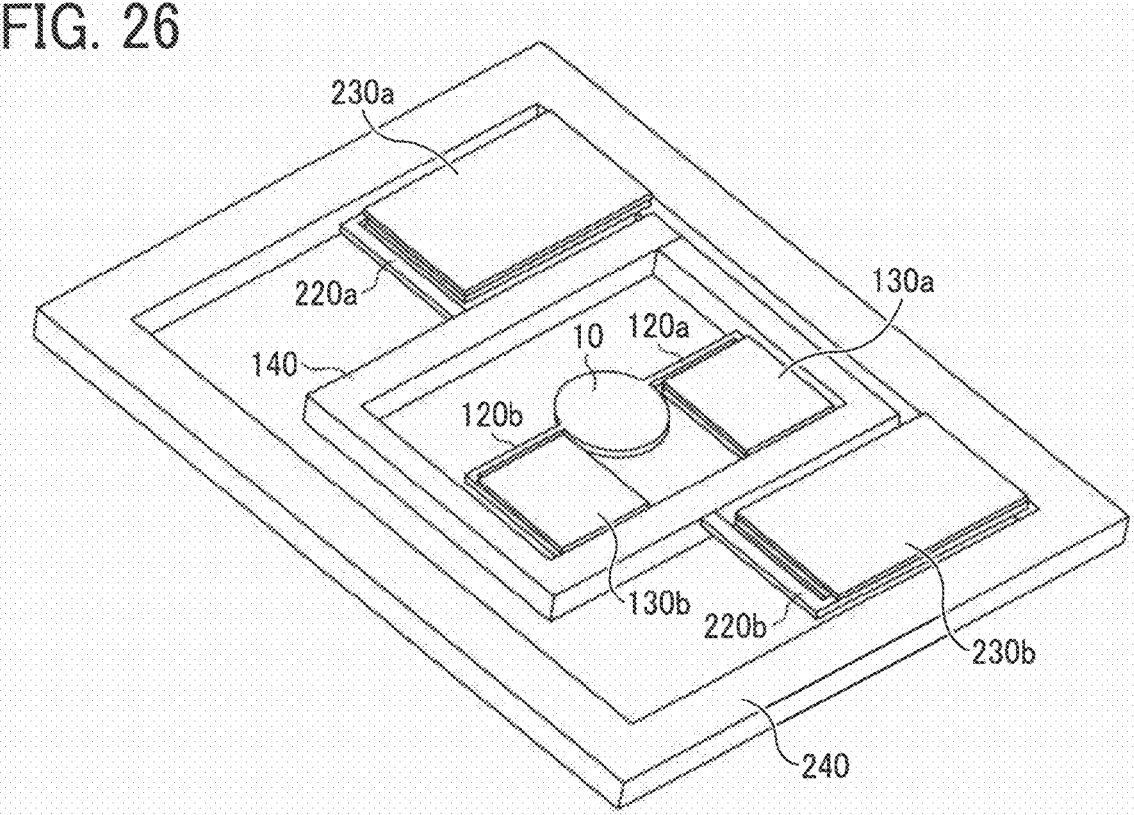
FIG. 26 is a perspective view illustrating a further embodiment of the optical deflector of the present invention in Example 9.

FIG. 26 is a perspective view illustrating a further embodiment of the optical deflector of the present invention in Example 9. Each of the optical deflectors having been explained deflects light in a uniaxial direction. This Example deflects light in a biaxial direction.

In FIG. 26, numeral 10 is a mirror having a reflection surface reflecting light. First torsion bar springs 120a and 120b as a pair of first elastic support members oscillatably supporting the mirror 10 are connected with both sides of the mirror 10. The other ends of the first torsion bar springs 120a and 120b, which are opposite to the mirror 10, are connected with ends of a pair of first drive beams 130a and 130b in a direction almost orthogonal to a longitudinal direction of the torsion bar springs 120a and 120b as a longitudinal direction. Each of the first drive beams 130a and 130b having a beam-shaped member, on one side of which a piezoelectric material is laminated, forms a unimorph structure having the shape of a plate strip-of-paper. The first drive beams 130a and 130b are connected so as to project in a same direction from inner one side of a movable frame 140 having a hole at the center, and located only one side of the torsion bar springs 120a and 120b. The drive beams 130a and 130b cantilever the mirror 10 and the torsion bar springs 120a and 120b relative to the movable frame 140.

Further, a pair of torsion bar springs 220a and 220b oscillatably supporting the movable frame 140 as second elastic support members are connected with both sides of the movable frame 140. The opposite ends of the second torsion bar springs 220a and 220b from a movable frame 42 are connected with a pair of second drive beams 230a and 230b in a direction almost orthogonal to a longitudinal direction of the torsion bar springs 220a and 220b as a longitudinal direction. Each of the second drive beams 230a and 230b having a beam-shaped member, on one side of which a piezoelectric material is laminated, forms a unimorph structure having the shape of a plate strip-of-paper as well. The second drive beams 230a and 230b are connected in the same direction from a fixed base 240 projectingly and located only one side of the second torsion bar springs 220a and 220b, respectively. The second drive beams 230a and 230b cantilever the movable frame 140 and the second torsion bar springs 220a and 220b relative to the fixed base 240.

In this Example, the first drive beams 130a and 130b oscillate the first torsion bar springs 120a and 120b to rotate the mirror 10 around axes of the first torsion bar springs 120a and 120b. The second drive beams 230a and 230b oscillate the second torsion bar springs 220a and 220b to rotate the movable frame 140 around axes of the first torsion bar springs 220a and 220b. When a characteristic frequency of an oscillation mode of a first rotation direction around the axes of the first torsion bar springs 120a and 120b and that of a second rotation direction around the axes of the second torsion bar springs 220a and 220b are different from each other, the respective frequencies drive the first drive beams 130a and 130b and the second torsion bar springs 220a and 220b to largely rotate the mirror 10 in a biaxial direction.

Example 10

Figure 27:
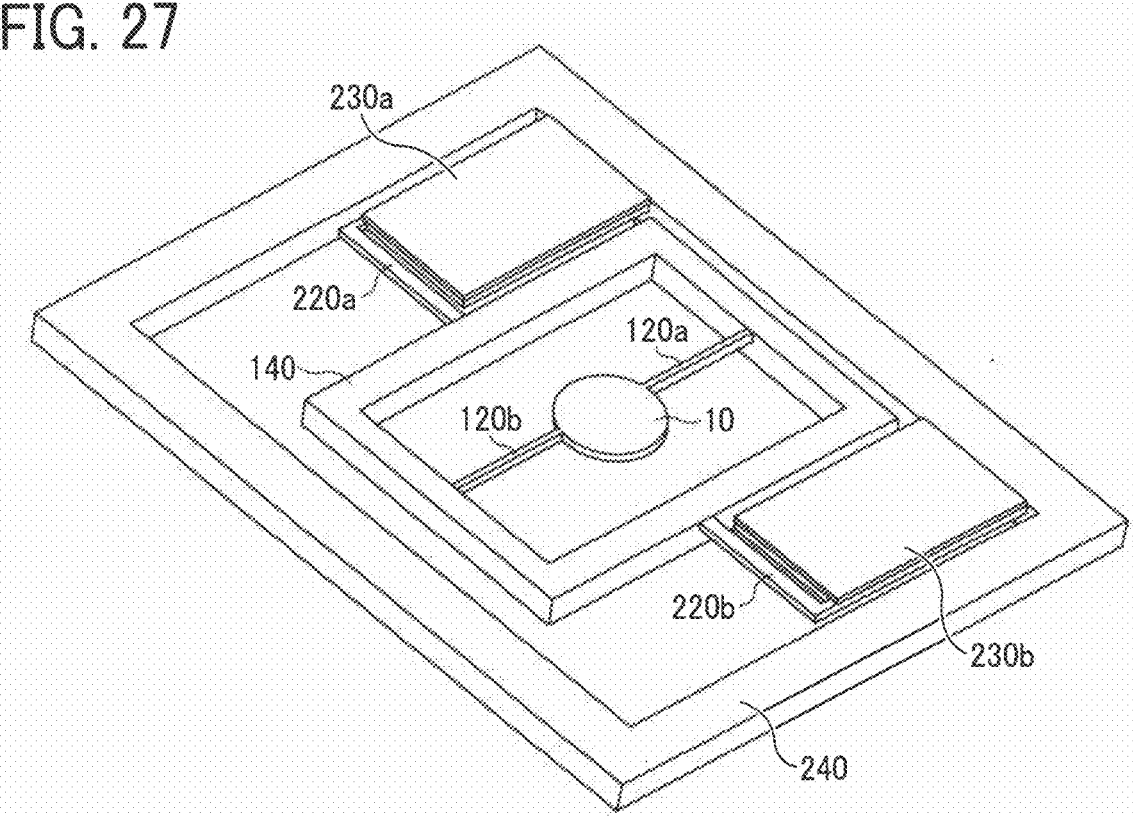
FIG. 27 is a perspective view illustrating a further embodiment of the optical deflector of the present invention in Example 10.

FIG. 27 is a perspective view illustrating a further embodiment of the optical deflector of the present invention in Example 10. This optical deflector deflects light in an biaxial direction as well, but its configuration and drive method are different from those of Example 9.

In FIG. 27, numeral 10 is a mirror having a reflection surface reflecting light. First torsion bar springs 120a and 120b as a pair of first elastic support members oscillatably supporting the mirror 10 are connected with both sides of the mirror 10. The other ends of the first torsion bar springs 120a and 120b, which are opposite to the mirror 10, are connected with an inside of two sides of a movable frame 140 having a hole at the center. Second torsion bar springs (elastic support members) 220a and 220b having a longitudinal direction in an orthogonal direction of the first torsion bar springs 120a and 120b are connected with outsides of the other two sides of the movable frame 140. Drive beams 230a and 230b having a longitudinal direction almost orthogonal to a longitudinal direction of the second torsion bar springs 220a and 220b are connected with the other ends of thereof, opposite to the movable frame 140. The drive beams 230a and 230b are connected in the same direction from a fixed base 240 projectingly and located only one side of the second torsion bar springs 220a and 220b, respectively. The drive beams 230a and 230b cantilever the mirror 10 and the second torsion bar springs 220a and 220b relative to the fixed base 240. Each of the drive beams 230a and 230b having a beam-shaped member, on one side of which a piezoelectric material is laminated, forms a unimorph structure having the shape of a plate strip-of-paper.

In this Example, the drive beams 230a and 230b applies an oscillation having the same phase to the second torsion bar springs 220a and 220b to rotate the movable frame 140 around axes of the second torsion bar springs 220a and 220b. The drive beams 230a and 230b applies an oscillation having a reverse phase to the second torsion bar springs 220a and 220b from each other to rotate the movable frame 140 around axes of the first torsion bar springs 120a and 120b. Thus, the mirror 10 rotates in the first rotation direction around the axes of the first torsion bar springs 120a and 120b and the second rotation direction around the axes of the second torsion bar springs 220a and 220b.

Specifically, when the characteristic frequencies of oscillation modes of the first rotation direction and the second rotation direction are different from each other, signals including the respective frequency components drive the second torsion bar springs 220a and 220b with a same and a reverse phase to largely rotate the mirror 10 in a biaxial direction. This Example does not need the first drive beams 130a and 130b in Example 9, and can easily be prepared at lower cost.

Example 11

This Example provides an optical scanner as an optical writing unit for image forming apparatus, using the optical deflectors deflecting light in monoaxial directions in Examples 1 to 8.

Figure 28:
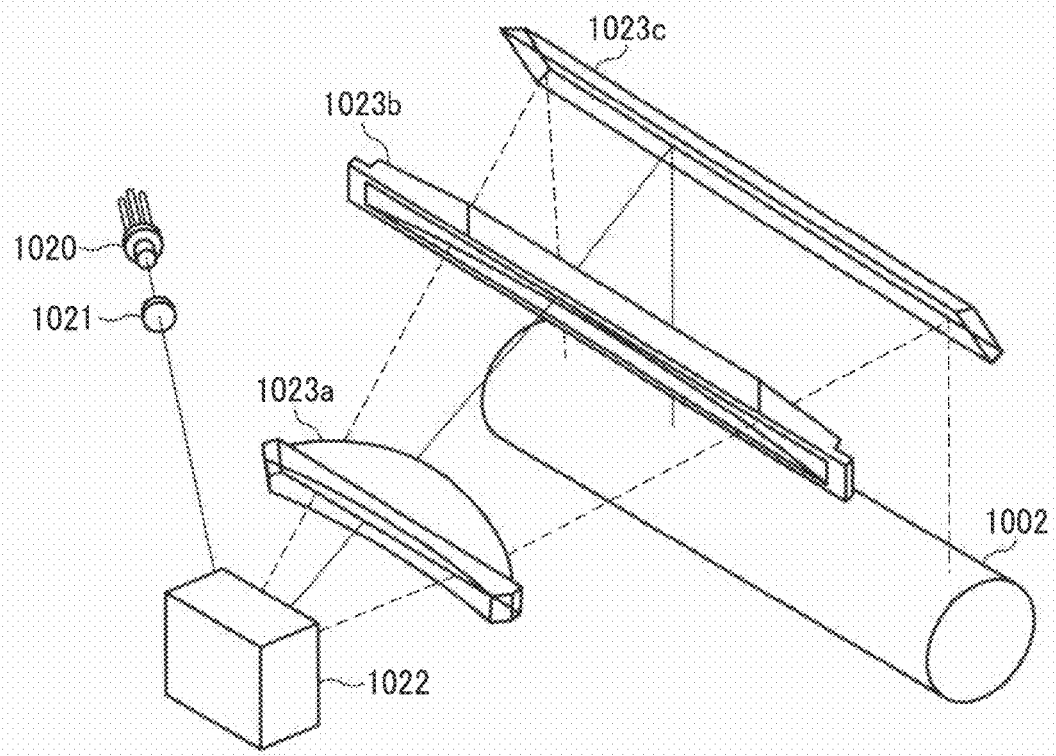
FIG. 28 is a schematic view illustrating an embodiment of all configurations of an optical scanner using the optical deflector of the present invention.
Figure 29:
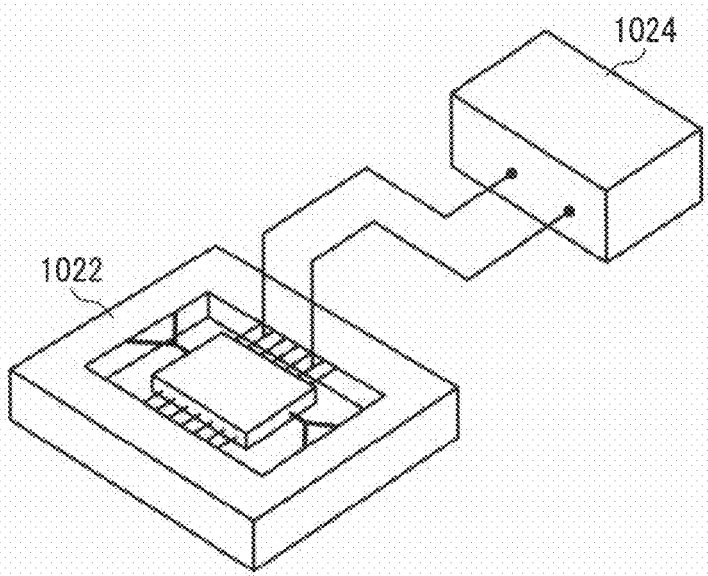
FIG. 29 is a schematic view illustrating a connection between the optical deflector and a drive unit in FIG. 28.

FIG. 28 is a schematic view illustrating an embodiment of all configurations of the optical scanner of the present invention. FIG. 29 is a schematic view illustrating a connection between the optical deflector and a drive unit used in the optical scanner.

In FIG. 28, a laser beam from a laser element 1020 is deflected by an optical deflector 1022 after passing a collimator lens system 1021. Any one of the optical deflectors in Examples 1 to 5 is used as the optical deflector 1022. The laser beam deflected by the optical deflector 1022 is then irradiated to a beam scanning surface 1002 of a photoreceptor drum, etc. after passing a scanning optical system formed of a first lens 1023a, a second lens 1023b and a reflection mirror 1023c.

As shown in FIG. 29, the optical deflector 1022 is electrically connected with a driver 1024. The driver 1024 applies a drive voltage to a lower electrode and an upper electrode of the optical deflector 1022. Thus, a mirror of the optical deflector 1022 rotates and the laser beam is deflected to scan the beam scanning surface 1002.

The optical scanner using the optical deflector of the present invention is most suitable as a constitutional member of an optical writing unit for image forming apparatuses such photographic printing printers and copiers.

Example 12

This Example provides an image forming apparatus equipped with the optical scanner in Example 11 as a constitutional member of an optical writing unit.

Figure 30:
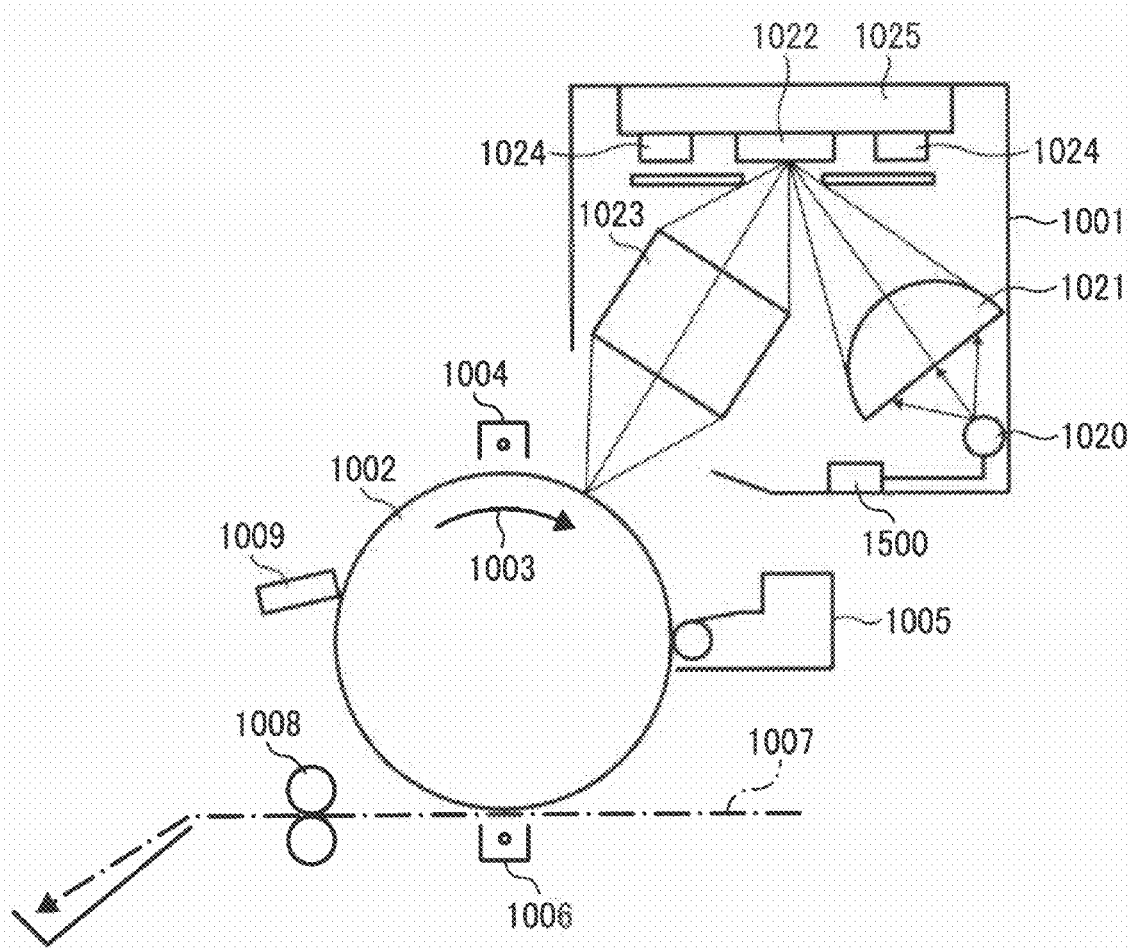
FIG. 30 is a schematic view illustrating an embodiment of all configurations of an image forming apparatus equipped with the optical scanner in FIG. 28 as an optical writing unit.

FIG. 30 is a schematic view illustrating an embodiment of all configurations of the image forming apparatus of the present invention. In FIG. 30, numeral 1001 is an optical writing unit emitting a laser beam to a surface to be scanned to write an image thereon. Numeral 1002 is a photoreceptor drum as an image bearer providing a surface to be scanned by the optical writing unit 1001.

The optical writing unit 1001 scans the surface (to be scanned) of the photoreceptor drum 1002 in an axial direction thereof with one or plural laser beams modulated by a recoding signal. The photoreceptor drum 1002 is driven to rotate in a direction indicated by an arrow 1003. The optical writing unit 1001 scans the surface of the photoreceptor drum 1002 charged by a charger 1004 to form an electrostatic latent image thereon. The electrostatic latent image is visualized to a toner image by an image developer 1005, and the toner image is transferred onto a recording paper 1007 by a transferer 1006. The toner image transferred onto the recording paper 1007 is fixed thereon by a fixer 1008. A toner remaining on the surface of the photoreceptor drum 1002 having passed the transferer 1006 is removed by a cleaner 1009.

A belt-shaped photoreceptor can be used instead of the photoreceptor drum 1002. In addition, it is possible that a toner image is transferred onto a transfer medium besides the recording paper at a time, and transferred onto a recording paper therefrom.

The optical writing unit 1001 includes a light source 1020 as a laser element emitting one or plural laser beams modulated by a recording signal, a light source driver 1500 modulating a laser beam, an optical deflector 1022 deflecting a laser beam in a monoaxial direction (of the present invention, having been explained), an image forming system 1021 forming an image of a laser beam modulated by a recording signal from the light source 1020 on a mirror surface of a mirror substrate of the optical deflector 1022, a scanning optical system 1023 forming an image of one or plural laser beams reflected/deflected at the mirror surface on the surface (to be scanned) of the photoreceptor drum 1002, etc. The optical deflector 1022 together with an integrated circuit (driver) 1024 driving the deflector is installed in the optical writing unit 1001 in the form of a circuit substrate.

The optical deflector 1022 is advantageously used to save electric power of image forming apparatus because of having lower power consumption than conventional rotary polygon mirrors to drive. In addition, the optical deflector 1022 is advantageously used to improve silence of image forming apparatus because of having lower oscillation noise than conventional rotary polygon mirrors. Further, he optical deflector 1022 is advantageously used to downsize image forming apparatus because of having quite smaller installation space than conventional rotary polygon mirrors and generating slight heat.

A feeder feeding the recording paper 1007, a driver driving the photoreceptor drum 1002, controllers for the image developer 1005 and the transferer 1006, a driver driving the light source 1020 are omitted in FIG. 21 because they may be the same as those of conventional image forming apparatus.

Example 13

This Example provides an image projection apparatus using an optical deflector deflecting light in a biaxial direction as shown in Examples 9 and 10.

Figure 31:
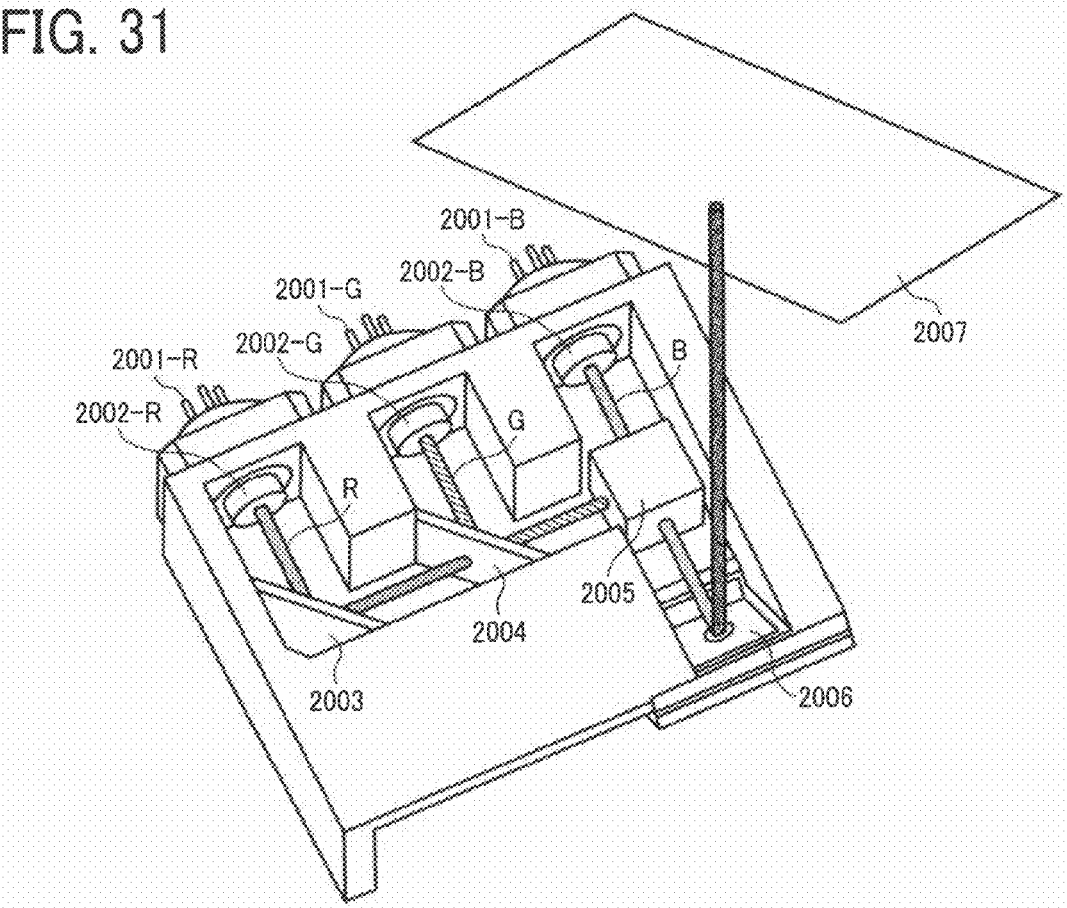
FIG. 31 is a perspective overall view illustrating an embodiment of the image projector using the optical deflector of the present invention.

FIG. 31 is a perspective overall view illustrating an embodiment of the image projector of the present invention. In FIG. 31, laser beam sources 2001-R, 2001-G and 2001-B emitting different 3-wavelength laser beams of red (R), green (G) and blue (B) are installed on a chassis 2000. Near emitting ends of the laser beam sources 2001-R, 2001-G and 2001-B, collecting lenses 2002-R, 2002-G and 2002-B almost parallely collecting emitted light from the laser beam sources 2001-R, 2001-G and 2001-B are located. The laser beams of red(R), green(G) and blue(B) almost parallelized by the collecting lenses 2002-R, 2002-G and 2002-B pass a mirror 2003 and a half mirror 2004, and are synthesized by a synthesizing prism 2005 and enter a mirror surface of an optical deflector 2006. The optical deflector 2006 is an optical deflector (two-dimensional reflection angle variable mirror) deflecting light in a biaxial direction as shown in Examples 9 and 10. The synthesized laser beam having entered the mirror surface of the optical deflector 2006 is two-dimensionally scanned and projected onto a projection surface to project an image.

Figure 32:
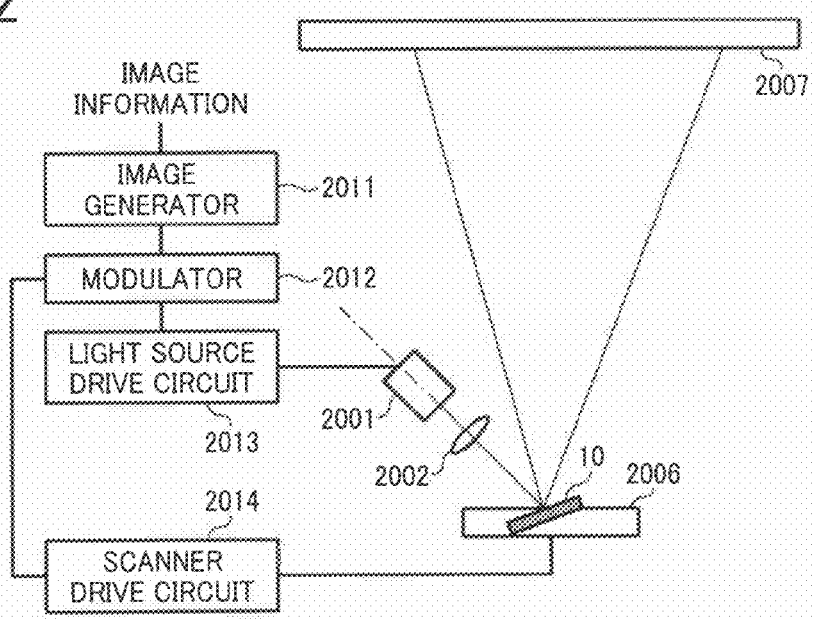
FIG. 32 is a schematic configuration diagram of the image projector in FIG. 31, including a drive unit.

FIG. 32 is a schematic configuration diagram of image projector in FIG. 31 including a drive unit. In FIG. 32, the 3-wavelength laser beam sources and collecting lenses are unified to one. The mirror, the half mirror and the synthesizing prism are omitted.

An image generator 2011 generates an image signal according to image information, and the image signal is transmitted to an optical drive circuit 2013 through a modulator 2012 and, at the same time, an image synchronized signal is transmitted to a scanner drive circuit 2014. The scanner drive circuit 2014 applies a drive signal to the optical deflector 2006 according to the image synchronized signal. The mirror 10 of the optical deflector 2006 resonantly oscillates at an amplitude of a predetermined angle, e.g., about 10 deg., in two orthogonal directions with the drive signal to two-dimensionally deflect and scan a laser beam having entered. Meanwhile, the intensity of a laser beam emitted from the laser beam source 2001 is modulated by the optical drive circuit 2013 in timing for the two-dimensional deflection scanning of the optical deflector 2006, by which a two-dimensional image information is projected on a projection surface 2007. A pulse width or an amplitude may be modulated for modulating intensity. The modulator 2012 modulates the pulse width or the amplitude of an image signal and the modulated signal is modulated to a current capable of driving the laser beam source 2001 to drive the laser beam source 2001.

A rotary scanning mirror such as polygon mirror can be used as an optical deflector. However, the optical deflector 2006 (two-dimensional reflection angle variable mirror) bin Examples 9 and 10 is advantageously used to save electric power of image projector because of having lower power consumption than conventional rotary scanning mirrors to drive. In addition, the optical deflector 2006 is advantageously used to improve silence of image projector because of having lower oscillation noise than conventional rotary scanning mirrors. Further, he optical deflector 2006 is advantageously used to downsize image projector because of having quite smaller installation space than conventional rotary scanning mirrors and generating slight heat.

This application claims priority and contains subject matter related to Japanese Patent Applications Nos. 2009-137817 and 2010-100659, filed on Jun. 9, 2009, and Apr. 26, 2010, respectively, the entire contents of each of which are hereby incorporated by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An optical deflector, comprising:
a fixed base;
a mirror having a light reflection surface;
a pair of elastic support members configured to oscillatably support the mirror; and
a pair of drive beams formed of a beam-shaped member on which a piezoelectric is fixed,
wherein the pair of elastic support members and the pair of drive beams in longitudinal directions are almost orthogonally located and connected with each other, other ends of the pair of drive beams are fixed on the same side of the fixed base, the mirror and the pair of elastic support members are cantilevered by the pair of drive beams relative to the fixed base, and bending oscillation of the drive beams causes torsional deformation of the elastic members to rotationally oscillate the mirror.

2. The optical deflector of claim 1, wherein a characteristic frequency of a first bending deformation mode of the drive beams is close to a characteristic frequency of a first torsion deformation mode of the elastic support members.

3. The optical deflector of claim 1, wherein a characteristic frequency of a first mode comprising the first bending deformation of the drive beams and a first bending deformation of the elastic support members is lower than a characteristic frequency of a second mode comprising the first torsion deformation of the elastic support members.

4. The optical deflector of claim 1, wherein the gravity center of the mirror is offset in a direction close to connection points between the drive beams and the fixed base.

5. The optical deflector of claim 4, wherein the mirror rotates around the center thereof in the second mode.

6. The optical deflector of claim 3, wherein the characteristic frequency of the first mode is close to the characteristic frequency of the second mode, and deformation amounts of connection points between the mirror and the elastic support members in a direction perpendicular to the light reflection surface are almost equal to those of movable ends of the drive beams.

7. The optical deflector of claim 1, wherein connection points between the elastic support members and the drive beams have areas of reduced thickness in a direction perpendicular to the light reflection surface.

8. The optical deflector of claim 1, wherein connection points between the drive beams and the elastic support members have cuts therein so that ends of the drive beams facing the mirror can be closer to the mirror than ends of the elastic support members opposite to the mirror.

9. The optical deflector of claim 1, wherein the ends of the drive beams facing the mirror are thicker than other parts of the drive beams.

10. An image forming apparatus, comprising:
    an optical scanner, comprising:
      a light source;
      an optical deflector configured to deflect a light beam from the light source, the optical deflector comprising:
        a fixed base;
        a mirror having a light reflection surface;
        a pair of elastic support members configured to oscillatably support the mirror; and
        a pair of drive beams formed of a beam-shaped member on which a piezoelectric is fixed,
        wherein the pair of elastic support members and the pair of drive beams in longitudinal directions are almost orthogonally located and connected with each other, other ends of the pair of drive beams are fixed on the same side of the fixed base, the mirror and the pair of elastic support members are cantilevered by the pair of drive beams relative to the fixed base, and bending oscillation of the drive beams causes torsional deformation of the elastic members to rotationally oscillate the mirror;
    an image forming optical system configured to form a spot-shaped image from the deflected light beam on a surface to be scanned;
    a photoreceptor configured to form a latent image thereon when scanned with the light beam;
    an image developer configured to develop the latent image into a visible image with toner to form a toner image; and
    a transferer configured to transfer the toner image into a recording medium.

11. An image projector, comprising:
    a light source configured to emit a light beam;
    a modulator configured to modulate the light beam according to an image signal;
    a collimating optical system configured to collimate the light beam; and
    an optical deflector, comprising:
      a fixed base;
      a mirror having a light reflection surface;
      a pair of elastic support members configured to oscillatably support the mirror; and
      a pair of drive beams formed of a beam-shaped member on which a piezoelectric is fixed,
    wherein the pair of elastic support members and the pair of drive beams in longitudinal directions are almost orthogonally located and connected with each other, other ends of the pair of drive beams are fixed on the same side of the fixed base, the mirror and the pair of elastic support members are cantilevered by the pair of drive beams relative to the fixed base, and bending oscillation of the drive beams causes torsional deformation of the elastic members to rotationally oscillate the mirror.

12. The optical deflector of claim 1, wherein:
    the pair of drive beams consists of a first drive beam and a second drive beam,
    the first drive beam has a distal edge opposite the side of the fixed base where the pair of drive beams are fixed,
    the first drive beam has an outer edge facing away from the second drive beam,
    the outer edge of the first drive beam extends along a first straight and continuous line from the fixed base to the distal edge of the first drive beam.

13. The optical deflector of claim 12, wherein:
    the pair of elastic support members consists of a first elastic support member and a second elastic support member,
    the first elastic support member has a distal edge facing away from the side of the fixed base where the pair of drive beams are attached,
    the distal edge of the first drive beam and the distal edge of the first elastic support member each extend along a second straight and continuous line from the outer edge of the first drive beam to the mirror.

14. The optical deflector of claim 13, wherein:
    the first straight and continuous line is substantially perpendicular to the second straight and continuous line.

* * * * *